United States Patent
Kano et al.

(10) Patent No.: US 9,975,092 B2
(45) Date of Patent: May 22, 2018

(54) GAS SEPARATION MEMBRANE AND GAS SEPARATION MEMBRANE MODULE

(71) Applicant: FUJIFILM Corporation, Tokyo (JP)

(72) Inventors: Kenji Kano, Ashigarakami-gun (JP); Kenichi Ishizuka, Ashigarakami-gun (JP); Satoshi Sano, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 145 days.

(21) Appl. No.: 15/093,961

(22) Filed: Apr. 8, 2016

(65) Prior Publication Data

US 2016/0220966 A1 Aug. 4, 2016

Related U.S. Application Data

(63) Continuation of application No. PCT/JP2014/075777, filed on Sep. 29, 2014.

(30) Foreign Application Priority Data

Oct. 11, 2013 (JP) .................................. 2013-214195

(51) Int. Cl.
*B01D 53/22* (2006.01)
*B01D 69/12* (2006.01)
(Continued)

(52) U.S. Cl.
CPC ........... *B01D 69/12* (2013.01); *B01D 53/228* (2013.01); *B01D 53/62* (2013.01); *B01D 69/02* (2013.01);
(Continued)

(58) Field of Classification Search
CPC ................ B01D 69/02; B01D 2256/10; B01D 2257/308; B01D 2256/16; B01D 2258/05;
(Continued)

(56) References Cited

U.S. PATENT DOCUMENTS 4,832,713 A * 5/1989 Yamada ................. B01D 69/12
210/490
4,857,080 A * 8/1989 Baker ................ B01D 67/0072
427/250

(Continued)

FOREIGN PATENT DOCUMENTS

JP 8-318140 A 12/1996
JP 9-103663 A 4/1997
(Continued)

OTHER PUBLICATIONS

Office Action dated Sep. 12, 2017 issued by the Japanese Patent Office in corresponding Japanese Application No. 2013-214195.
(Continued)

*Primary Examiner* — Anthony Shumate
(74) *Attorney, Agent, or Firm* — Sughrue Mion, PLLC

(57) ABSTRACT

Provided is a gas separation membrane 10 including a separation layer 1 which comprises a block copolymer having at least a first segment and a second segment, in which the separation layer 1 has a phase separation structure that has at least a first structure 11 derived from the first segment and a spherical second structure 12 derived from the second segment. The gas separation membrane in which the spherical second structure satisfies Formula 1, the first structure and the spherical second structure satisfy the following Formula 2, and the first structure 11 has a structure that is continuous in the thickness direction over the entire thickness of the separation layer 1 has high gas permeability and high gas separation selectivity. Also provided is a gas separation membrane module.

$R/L<0.4$      Formula 1:

$Ps/Pf<1$      Formula 2:

(R represents the average diameter of the spherical second structure, L represents the thickness of the separation layer,
(Continued)

Ps represents the permeability coefficient of the first structure, and Pf represents the permeability coefficient of the spherical second structure. In this case, Ps and Pf represent the permeability coefficient of a gas with a higher permeability coefficient in the first structure, among two kinds of gases.)

11 Claims, 1 Drawing Sheet

(51) Int. Cl.
  B01D 69/02  (2006.01)
  B01D 71/64  (2006.01)
  B01D 71/70  (2006.01)
  B01D 71/80  (2006.01)
  B01D 53/62  (2006.01)
  B01D 71/16  (2006.01)
  B01D 71/52  (2006.01)
  B01D 71/56  (2006.01)
  B01D 71/62  (2006.01)

(52) U.S. Cl.
  CPC ............ B01D 71/64 (2013.01); B01D 71/70 (2013.01); B01D 71/80 (2013.01); B01D 71/16 (2013.01); B01D 71/52 (2013.01); B01D 71/56 (2013.01); B01D 71/62 (2013.01); B01D 2053/221 (2013.01); B01D 2256/10 (2013.01); B01D 2256/16 (2013.01); B01D 2256/20 (2013.01); B01D 2256/24 (2013.01); B01D 2256/245 (2013.01); B01D 2257/302 (2013.01); B01D 2257/304 (2013.01); B01D 2257/308 (2013.01); B01D 2257/404 (2013.01); B01D 2257/502 (2013.01); B01D 2257/504 (2013.01); B01D 2258/025 (2013.01); B01D 2258/0233 (2013.01); B01D 2258/0283 (2013.01); B01D 2258/05 (2013.01); B01D 2325/04 (2013.01); B01D 2325/20 (2013.01); Y02C 10/04 (2013.01); Y02C 10/10 (2013.01)

(58) Field of Classification Search
  CPC .. B01D 71/62; B01D 71/16; B01D 2053/221; B01D 2325/04; B01D 2256/20; B01D 53/62; B01D 2257/404; B01D 2257/304; B01D 69/12; B01D 2258/025; B01D 2257/504; B01D 71/56; B01D 71/52; B01D 53/228; B01D 1/70; B01D 2256/24; B01D 2325/20; B01D 2257/502; B01D 71/80; B01D 2257/302; B01D 2258/0283; B01D 2256/245; B01D 2258/0233; B01D 71/64
  See application file for complete search history.

(56) References Cited

U.S. PATENT DOCUMENTS

| | | | | |
|---|---|---|---|---|
| 4,963,165 A | * | 10/1990 | Blume | B01D 71/80 427/385.5 |
| 4,964,990 A | * | 10/1990 | Kraus | B01D 67/0011 210/490 |
| 5,067,971 A | * | 11/1991 | Bikson | B01D 53/22 95/52 |
| 5,238,613 A | * | 8/1993 | Anderson | A61F 2/14 210/500.27 |
| 5,512,336 A | * | 4/1996 | Yamahara | G02F 1/133711 349/123 |
| 5,702,503 A | * | 12/1997 | Tse Tang | B01D 53/228 427/434.3 |
| 6,214,936 B1 | * | 4/2001 | Mehler | B01D 53/228 523/106 |
| 8,338,534 B2 | | 12/2012 | Konishi et al. | |
| 8,357,754 B2 | | 1/2013 | Konishi et al. | |
| 8,747,521 B2 | | 6/2014 | Sano | |
| 9,346,921 B2 | * | 5/2016 | Balsara | B01D 71/80 |
| 2003/0173568 A1 | * | 9/2003 | Asakawa | H01L 33/22 257/79 |
| 2007/0146887 A1 | * | 6/2007 | Ikeda | G02B 1/111 359/586 |
| 2009/0087653 A1 | * | 4/2009 | Nealey | B01D 69/10 428/339 |
| 2010/0036009 A1 | | 2/2010 | Konishi et al. | |
| 2010/0298515 A1 | * | 11/2010 | Marchand | C08F 297/08 526/336 |
| 2010/0313752 A1 | * | 12/2010 | Powell | B01D 53/228 95/45 |
| 2012/0058435 A1 | * | 3/2012 | Seino | G03F 7/0755 430/324 |
| 2012/0252912 A1 | | 10/2012 | Konishi et al. | |
| 2012/0297976 A1 | | 11/2012 | Sano | |
| 2013/0180920 A1 | * | 7/2013 | Sivaniah | B01D 67/003 210/650 |
| 2013/0256263 A1 | * | 10/2013 | Kihara | B44C 1/227 216/41 |
| 2014/0048477 A1 | * | 2/2014 | Kang | C02F 1/44 210/500.21 |
| 2014/0287266 A1 | * | 9/2014 | Watanabe | G11B 5/743 428/800 |
| 2015/0056399 A1 | * | 2/2015 | Takeoka | B29C 41/12 428/64.1 |
| 2015/0151256 A1 | * | 6/2015 | Abetz | B01D 67/0011 210/500.28 |
| 2015/0343395 A1 | * | 12/2015 | Aamer | B01D 67/0016 210/490 |

FOREIGN PATENT DOCUMENTS

| | | |
|---|---|---|
| JP | 2005-97625 A | 4/2005 |
| JP | 2008-189910 A | 8/2008 |
| JP | 2011-502049 A | 1/2011 |
| WO | 2009/059360 A1 | 5/2009 |
| WO | 2011/099587 A1 | 8/2011 |

OTHER PUBLICATIONS

Tsutomu Nakagawa et al., "Morphology and gas permeability in copolyimides containing polydimethylsiloxane block", Journal of Membrane Science, 2002, pp. 149-163, vol. 206.
Dulce M. Muñoz et al., "Thermal treatment of ploy(ethylene oxide)-segmented copolyimide based membranes: An effective way to improve the gas separation properties", Journal of Membrane Science, 2008, pp. 53-59, vol. 323.
International Search Report for PCT/JP2014/075777 dated Dec. 22, 2014.
Written Opinion for PCT/JP2014/075777 dated Dec. 22, 2014.
Furukawa et al., "Properties and Applications of Silicon Containing Polyimides", Journal of the Adhesion Society of Japan, 33 (2), pp. 63 to 73, Feb. 1, 1997 (pdf file 6 pages in total).
International Preliminary Report on Patentability for PCT/JP2014/075777 dated Apr. 21, 2016.

* cited by examiner

GAS SEPARATION MEMBRANE AND GAS SEPARATION MEMBRANE MODULE

CROSS-REFERENCE TO RELATED APPLICATIONS

This application is a Continuation of PCT International Application No. PCT/JP2014/075777, filed on Sep. 29, 2014, which claims priority under 35 U.S.C. Section 119(a) to Japanese Patent Application No. 2013-214195 filed on Oct. 11, 2013. Each of the above applications is hereby expressly incorporated by reference, in its entirety, into the present application.

BACKGROUND OF THE INVENTION

1. Field of the Invention

The present invention relates to a gas separation membrane and a gas separation membrane module. More specifically, the present invention relates to a gas separation membrane which has high gas permeability and high gas separation selectivity and a gas separation membrane module which has the gas separation membrane.

2. Description of the Related Art

A material formed of a polymer compound has a gas permeability specific to the material. Based on this property, it is possible to cause selective permeation and separation out of a target gas component using a membrane formed of a specific polymer compound (gas separation membrane). As an industrial use aspect for this gas separation membrane related to the problem of global warming, separation and recovery from large-scale carbon dioxide sources with this gas separation membrane has been examined in thermal power plants, cement plants, or ironworks blast furnaces. Further, this membrane separation technique has been attracting attention as a means for solving environmental issues which can be achieved with relatively little energy. In addition, the technique is being examined as a means for removing carbon dioxide from natural gas or biogas (biological excrement, organic fertilizers, biodegradable substances, sewage, garbage, fermented energy crops, or gas generated due to anaerobic digestion).

As a membrane separation method for securing gas permeability and gas separation selectivity by making a site contributing to gas separation into a thin layer to be used as a practical gas separation membrane, a method of making a portion contributing to separation serving as an asymmetric membrane into a thin layer which is referred to as a skin layer, a method of using, as materials having mechanical strength, a support and a thin film composite provided with a selective layer contributing to gas separation which is disposed on the support, or a method of using hollow fibers including a layer which contributes to gas separation and has high density is known. In the above-described methods, layers contributing to gas separation are commonly referred to as separation layers.

In a gas separation membrane, gas separation selectivity is expressed by means of using a material with high gas separation selectivity as a separation layer contributing to separation. The gas purity can be increased by unn gas in mixed gas selectively passing through a membrane.

An example in which a separation membrane is formed using a block copolymer such as a diblock copolymer having a binary system or a triblock terpolymer having a ternary system as a material of the separation membrane is known.

For example, JP2008-189910A describes a method of obtaining a microporous membrane suitable to be used as a separation membrane such as a microfiltration membrane or an ultrafiltration membrane by means of using a polymer consisting of three kinds of segments. The paragraph [0044] describes a form in which pores are formed such that both main surfaces of the membrane are connected to each other. Further, a pore structure having such through-holes is also known in fields other than separation membranes, and JP2005-97625A describes a method of preparing a hierarchical structure, which has through-holes, using a block copolymer.

Moreover, as literature suggesting that a block copolymer is used as a gas separation membrane, Journal of the Adhesion Society of Japan 33 (2), Furukawa et. al., pp. 63 to 73, 1997-02-01; Journal of Membrane Science 206 (2002), pp. 149 to 163; and Journal of Membrane Science 323 (2008), pp. 53 to 59, can be exemplified.

Journal of the Adhesion Society of Japan 33 (2), Furukawa et. al., pp. 63 to 73, 1997-02-01 suggests that a statistical copolymer of polyimide containing siloxane which has a structure having a segment formed of repeating units of dimethylsiloxane and an imide and a segment of polyimide in the main chain has a microphase-separated structure, but there is no description of the relationship between the phase-separated structure and the film thickness.

Journal of Membrane Science 206 (2002), pp. 149 to 163 discloses a statistical copolymer of polyimide containing siloxane which has a structure having a segment formed of repeating units of dimethylsiloxane and an imide and a segment formed of repeating units of diphenyl ether and an imide in the main chain and also discloses data related to gas separation selectivity, but the internal structure of a polymer layer or the film thickness has not been researched.

Journal of Membrane Science 323 (2008), pp. 53 to 59 discloses a statistical copolymer of polyimide which has a structure having a segment formed of repeating units of diphenyl ether and an imide and a segment formed of repeating units of diamine-containing polyethylene glycol and an imide and also discloses data related to gas separation selectivity, but the internal structure of a polymer layer or the film thickness has not been researched.

Here, in a case where the thickness of the separation layer is uniform, the selectivity for gases is not greatly affected by the thickness thereof, but the permeability is greatly affected by that. When the thickness thereof is uniform, the gas permeability may increase as the separation layer becomes thinner and the processing capacity of mixed gas can be increased when the gas separation selectivity does not deteriorate. However, when the separation layer is practically intended to be thinned, the probability that defects (for example, through-holes passing through the separation layer) will be generated in a part of the membrane becomes higher. For this reason, practically, there is a lower limit when thinning the separation layer while the gas separation selectivity is maintained.

An object of the present invention is to provide a gas separation membrane which has high gas permeability and high gas separation selectivity.

SUMMARY OF THE INVENTION

As a result of intensive research conducted by the present inventors in order to solve the above-described problems, it was found that a gas separation membrane which has high gas permeability and high gas separation selectivity can be achieved by using a block copolymer to be formed from two kinds of molecular structures, that are, a structure having high gas permeability and a structure having low gas permeability as a material of the separation layer contributing to the gas separation selectivity and making the portion having high gas permeability spherical so that the average diameter of the sphere becomes sufficiently smaller than the thickness of the separation layer.

The present invention which is the specific means for solving the above-described problems is as follows.

[1] A gas separation membrane comprising: a separation layer which includes a block copolymer having at least a first segment and a second segment, in which the separation layer has a phase separation structure that has at least a first structure derived from the first segment and a spherical second structure derived from the second segment, the spherical second structure satisfies the following Formula 1, the first structure and the spherical second structure satisfy the following Formula 2, and the first structure has a structure that is continuous in the thickness direction over the entire thickness of the separation layer.

$$R/L < 0.4 \qquad \text{Formula 1:}$$

(In Formula 1, R represents the average diameter (unit: nm) of the spherical second structure and L represents the thickness (unit: nm) of the separation layer.)

$$Ps/Pf < 1 \qquad \text{Formula 2:}$$

(In Formula 2, Ps represents the permeability coefficient (unit: Barrer) of the first structure and Pf represents the permeability coefficient (unit: Barrer) of the spherical second structure. In this case, Ps and Pf represent the permeability coefficient of a gas with a higher permeability coefficient in the first structure, among two kinds of gases.)

[2] In the gas separation membrane according to [1], it is preferable that the first structure and the spherical second structure satisfy the following Formulae 3 and 2A.

$$\alpha s/\alpha f > 3 \qquad \text{Formula 3:}$$

(In Formula 3, αs represents the gas separation selectivity of the first structure and αf represents the gas separation selectivity of the spherical second structure. In this case, αs and αf represent the gas separation selectivity for gas mixtures consisting of two kinds of gases and having the same composition as each other.)

$$Ps/Pf < 0.1 \qquad \text{Formula 2A:}$$

(In Formula 2A, Ps represents the permeability coefficient (unit: Barrer) of the first structure and Pf represents the permeability coefficient (unit: Barrer) of the spherical second structure. In this case, Ps and Pf represent the permeability coefficient of a gas with a higher permeability coefficient in the first structure, among two kinds of gases.)

[3] In the gas separation membrane according to [1] or [2], it is preferable that the first segment is at least one selected from polyimide, polyamide, cellulose acetate, and polybenzoxazole.

[4] In the gas separation membrane according to any one of [1] to [3], it is preferable that the second segment is at least one selected from polydimethylsiloxane, poly(1-trimethylsilyl-1-propyne), and polyethylene oxide.

[5] In the gas separation membrane according to any one of [1] to [4], it is preferable that the separation layer further has at least one homopolymer selected from polyimide, polybenzoxazole, and cellulose acetate.

[6] In the gas separation membrane according to any one of [1] to [5], it is preferable that the separation layer is formed on a support.

[7] In the gas separation membrane according to [6], it is preferable that the support is formed of non-woven fabric and a porous layer provided on at least one surface of the non-woven fabric.

[8] It is preferable that the gas separation membrane according to [6] or [7] further comprises a resin layer between the separation layer and the support.

[9] In the gas separation membrane according to [8], it is preferable that the material of the resin layer is at least one selected from polydimethylsiloxane, poly(1-trimethylsilyl-1-propyne), and polyethylene oxide.

[10] It is preferable that the gas separation membrane according to any one of [1] to [9] further comprises a protective layer on the separation layer.

[11] In the gas separation membrane according to [10], it is preferable that the material of the protective layer is at least one selected from polydimethylsiloxane, poly(1-trimethylsilyl-1-propyne), and polyethylene oxide.

[12] A gas separation membrane module having the gas separation membrane according to any one of [1] to [11].

According to the present invention, it is possible to provide a gas separation membrane which comprises high gas permeability and high gas separation selectivity.

DESCRIPTION OF THE PREFERRED EMBODIMENTS

Figure 1:
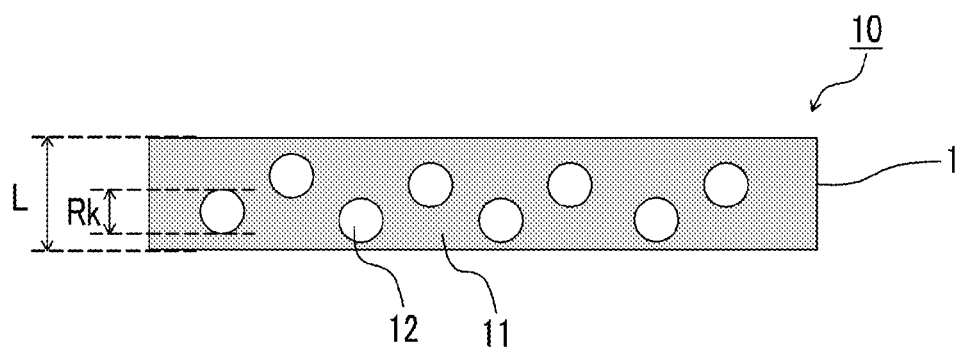
FIG. 1 is a schematic view showing the section of a gas separation membrane which is an example of the present invention.

Hereinafter, the present invention will be described in detail. The description of constituent elements described below is occasionally made based on the exemplary embodiments of the present invention, but the present invention is not limited to such embodiments. In addition, the numerical ranges shown using "to" in the present specification indicate ranges including the numerical values described before and after "to" as the lower limits and the upper limits.

Here, a "segment" indicates a polymer structure unit formed by connecting a plurality of predetermined repeating units to each other in a block copolymer. Further, the "block copolymer" indicates a polymer compound in a state in which two or more kinds of segments are bonded to each other directly or through a linking group.

In the present specification, when a plurality of substituent groups or linking groups (hereinafter, referred to as substituent groups or the like) shown by specific symbols are present or a plurality of substituent groups are defined simultaneously or alternatively, this means that the respective substituent groups may be the same as or different from each other. In addition, even in a case where not specifically stated, when a plurality of substituent groups or the like are adjacent to each other, it means that they may be condensed or linked to each other and form a ring.

In regard to compounds (including resins) described in the present specification, the description includes salts thereof and ions thereof in addition to the compounds. Further, the description includes derivatives formed by changing a predetermined part within the range in which desired effects are exhibited.

A substituent group (the same applies to a linking group) in which substitution or non-substitution is not specified in the present specification may include an optional substituent group of the group within the range in which desired effects are exhibited. The same applies to a compound in which substitution or non-substitution is not specified.

A preferable range of a group Z of substituent groups described below is set as a preferable range of a substituent group in the present specification unless otherwise specified.

[Gas Separation Membrane]

A gas separation membrane of the present invention comprises a separation layer which includes a block copolymer having at least a first segment and a second segment, in which the separation layer has a phase separation structure that has at least a first structure derived from the first segment and a spherical second structure derived from the second segment, the spherical second structure satisfies the following Formula 1, the first structure and the spherical second structure satisfy the following Formula 2, and the first structure has a structure that is continuous in the thickness direction over the entire thickness of the separation layer.

$$R/L < 0.4 \quad \text{Formula 1:}$$

(In Formula 1, R represents the average diameter (unit: nm) of the spherical second structure and L represents the thickness (unit: nm) of the separation layer.)

$$Ps/Pf < 1 \quad \text{Formula 2:}$$

(In Formula 2, Ps represents the permeability coefficient (unit: Barrer) of the first structure and Pf represents the permeability coefficient (unit: Barrer) of the spherical second structure. In this case, Ps and Pf represent the permeability coefficient of a gas with a higher permeability coefficient in the first structure, among two kinds of gases.)

With such a configuration, the gas separation membrane of the present invention has high gas permeability and high gas separation selectivity. In a case where a block copolymer is not used, there is a limit to making the separation layer thin and the separation layer is in the relationship of trade-off, which means that degradation of gas separation selectivity is caused when high gas permeability is attempted to be achieved using a thin separation layer. In the present invention, high gas permeability can be achieved without causing degradation of gas separation selectivity, even in a case where the separation layer is thinned such that the thickness thereof is the same, by using a block copolymer which can form at least two kinds of specific structures in the inside of the thin separation layer as the material constituting the separation layer.

Hereinafter, preferred embodiments of the gas separation membrane of the present invention will be described.

<Configuration>

It is preferable that the gas separation membrane of the present invention is a thin film composite or an asymmetric membrane or is formed of hollow fibers.

In the present invention, it is preferable that the gas separation membrane is a thin film composite. Further, hereinafter, a case where the gas separation membrane is a thin film composite is occasionally described as a typical example, but the gas separation membrane of the present invention is not limited by the thin film composite.

In a case where the separation layer of the gas separation membrane of the present invention is produced, the gas separation membrane is divided into a gap portion with gaps and a separation layer which does not have gaps when film formation is carried out according to a so-called phase separation method in which gas is allowed to pass through a poor solvent after application of a solution. The thickness of the separation layer can be acquired by performing SEM observation on the section of the gas separation membrane and measuring the thickness of a portion which does not have gaps.

The preferred configuration of the gas separation membrane of the present invention will be described with reference to the accompanying drawings.

A gas separation membrane 10 of the present invention which is shown in FIG. 1 comprises a separation layer 1. The separation layer 1 has a phase separation structure having at least a first structure 11 and a spherical second structure 12, and the first structure 11 has a structure that is continuous in the thickness direction over the entire thickness L of the separation layer 1.

The phase separation structure of the separation layer 1, which has at least the first structure 11 and the spherical second structure 12, can be confirmed by the section of the separation layer 1 having an interface between a plurality of first structures and spherical second structures in an SEM image of the section of the separation layer of the gas separation membrane.

In FIG. 1, each diameter of the spherical second structures 12 is set as Rk. In addition, the average diameter of at least twenty diameters of the spherical second structures 12 is set as R.

The "spherical" structure in the spherical second structure 12 is not limited to a perfect sphere, includes a sphere having a distortion, and may be ellipsoidal. In addition, the interface thereof may have wavy distortion or projections.

In the present specification, a diameter of a circle corresponding to the spherical second structure 12 in the SEM image showing the section of the separation layer of the gas separation membrane is used as a diameter Rk of the spherical second structure 12. A diameter of a perfect circle obtained by converting the area of a figure corresponding to the spherical second structure 12 in the SEM image showing the section of the separation layer of the gas separation membrane is used as the diameter Rk of the spherical second structure 12 in a case where the spherical second structure 12 is a sphere having a distortion.

In FIG. 1, the first structure 11 has a structure that is continuous in the thickness direction over the entire thickness L of the separation layer 1. The expression "the first structure has a structure that is continuous in the thickness direction over the entire thickness of the separation layer" means that the separation layer does not have a portion which is formed of only a single second structure over the entire thickness of the separation layer or a portion which is formed of only the second structures by two or more second structures being connected to each other over the entire thickness of the separation layer.

In the present specification, a measured thickness in the SEM image showing the section of the separation layer of the gas separation membrane is used as the thickness L of the separation layer 1.

Figure 2:
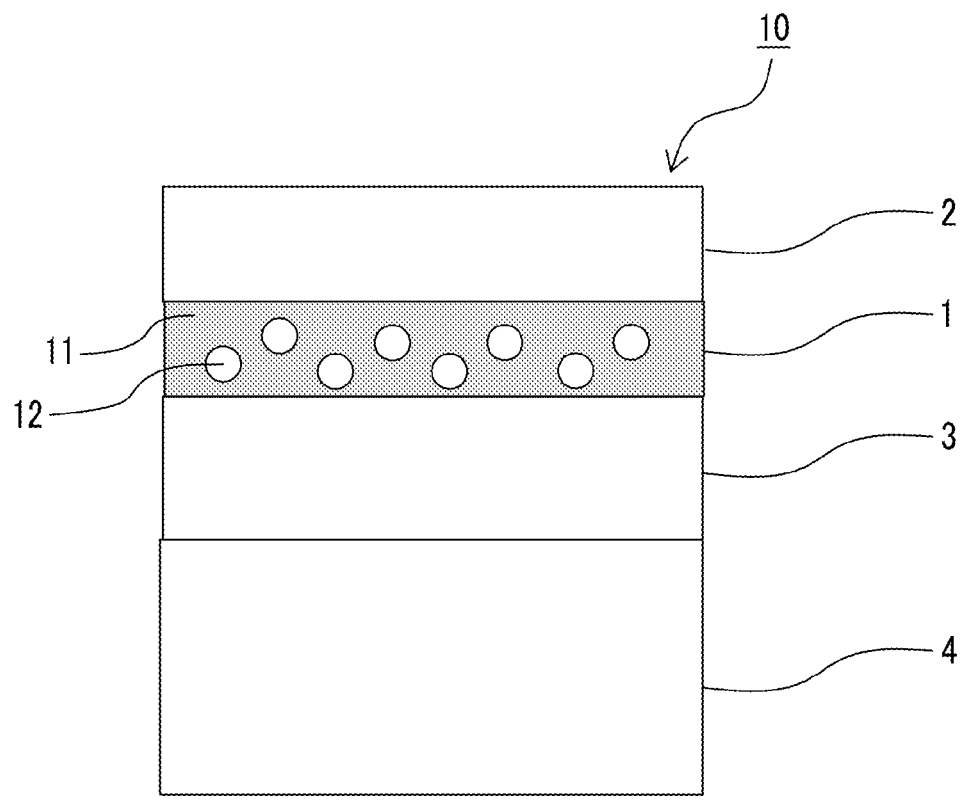
FIG. 2 is a schematic view showing the section of a gas separation membrane which is another example of the present invention and shows an aspect of the gas separation membrane further including a support, a resin layer, and a protective layer.

FIG. 2 shows another example of a preferred embodiment of a gas separation membrane of the present invention. The gas separation membrane 10 of the present invention, shown in FIG. 2, is a thin film composite. The gas separation membrane 10 comprises a separation layer 1 and a protective layer 2 formed on the separation layer 1.

In the gas separation membrane 10 of the present invention, it is preferable that the separation layer 1 is formed on a support 4.

It is preferable that the gas separation membrane 10 of the present invention has a resin layer 3 between the separation layer 1 and the support 4.

<Separation Layer>

The separation layer includes a block copolymer having at least a first segment and a second segment and has a phase separation structure that has at least a first structure derived from the first segment and a spherical second structure derived from the second segment, the spherical second structure satisfies the following Formula 1, the first structure and the spherical second structure satisfy the following Formula 2, and the first structure has a structure that is continuous in the thickness direction over the entire thickness of the separation layer.

$R/L<0.4$    Formula 1:

(In Formula 1, R represents the average diameter (unit: nm) of the spherical second structure and L represents the thickness (unit: nm) of the separation layer.)

$Ps/Pf<1$    Formula 2:

(In Formula 2, Ps represents the permeability coefficient (unit: Barrer) of the first structure and Pf represents the permeability coefficient (unit: Barrer) of the spherical second structure. In this case, Ps and Pf represent the permeability coefficient of a gas with a higher permeability coefficient in the first structure, among two kinds of gases.)

(Block Copolymer)

The block copolymer included in the separation layer has at least the first segment and the second segment. It is preferable that the block copolymer is formed of the first segment and the second segment and more preferable that the block copolymer has a structure represented by A-B when the first segment is set as A and the second segment is set as B.

From the viewpoint that the separation layer forms a phase separation structure having at least the first structure derived from the first segment and the spherical second structure derived from the second segment, it is preferable that the first segment is incompatible with the second segment.

When the first segment is incompatible with the second segment, it is preferable that a good solvent of the first segment is a poor solvent of the second segment.

—First Segment—

It is preferable that the first segment of the block copolymer is at least one selected from polyimide, polyamide, cellulose acetate, and polybenzoxazole and also preferable that the first segment is polyimide.

Hereinafter, a case where the first segment is polyimide will be described as a typical example, but the present invention is not limited to the following embodiment.

More specifically, it is preferable that polyimide includes at least one repeating unit represented by the following Formula (I), at least one repeating unit represented by the following Formula (II-a) or (II-b), and at least one repeating unit represented by the following Formula (III-a) or (III-b).

The polyimide which can be used in the present invention may include repeating units other than the respective repeating units described above, and the number of moles thereof is preferably 20 or less and more preferably in a range of 0 to 10 when the total number of moles of the respective repeating units represented by each of the above-described formulae is set to 100. It is particularly preferable that the polyimide which can be used in the present invention is formed of only the respective repeating units represented by each of the following formulae.

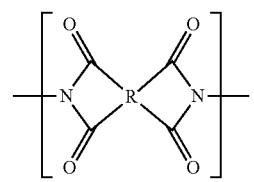

Formula (I)

In Formula (I), R represents a group having a structure represented by any of the following Formulae (I-a) to (I-h). In the following Formulae (I-a) to (I-h), the symbol "*" represents a binding site with respect to a carbonyl group of Formula (I). R in Formula (I) is occasionally referred to as a mother nucleus, and it is preferable that this mother nucleus R is a group represented by Formula (I-a), (I-b), or (I-d), more preferable that this mother nucleus R is a group represented by Formula (I-a) or (I-d), and particularly preferable that this mother nucleus R is a group represented by Formula (I-a).

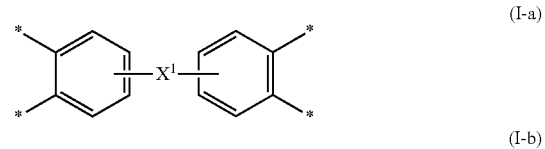

(I-a)

(I-b)

(I-c)

(I-d)

(I-e)

(I-f)

(I-g)

-continued

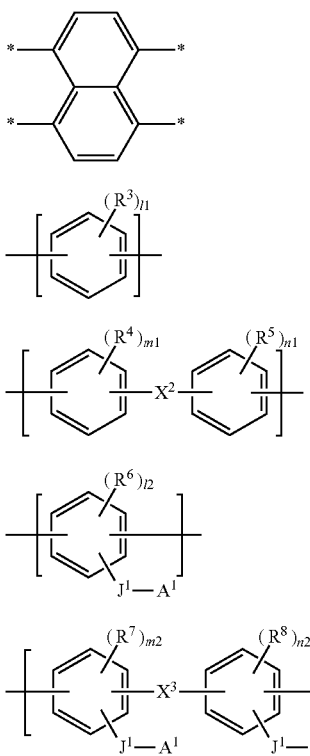

(I-h)

Formula (II-a)

Formula (II-b)

Formula (III-a)

Formula (III-b)

$X^1$, $X^2$, and $X^3$ $X^1$, $X^2$, and $X^3$ represent a single bond or a divalent linking group. As the divalent linking group, —C($R^x$)$_2$— ($R^x$ represents a hydrogen atom or a substituent group. In a case where $R^x$ represents a substituent group, $R^x$'s may be linked to each other and form a ring or $R^x$ may be linked to any of $R^4$, $R^5$, $R^7$, and $R^8$ and form a ring), —O—, —SO$_2$—, —C(=O)—, —S—, —NR$^Y$— ($R^Y$ represents a hydrogen atom, an alkyl group (preferably a methyl group or an ethyl group), or an aryl group (preferably a phenyl group)), or a combination of these is preferable and a single bond, —C(=O)—, or —C($R^x$)$_2$— is more preferable.

When $R^x$ represents a substituent group, a group Z of substituent groups described below is specifically exemplified. Among these, an alkyl group (the preferable range is the same as that in the group Z of substituent groups described below) is preferable. Moreover, $R^x$ may represent an alkyl group having a halogen atom as a substituent group. Further, in regard to the expression "may be linked to each other and form a ring" in the present specification, the linkage may be made by a single bond or a double bond and then a cyclic structure may be formed or condensation may be made and then a condensed ring structure may be formed.

Here, it is particularly preferable that $X^1$ represents —C(=O)— and $X^3$ represents —C($R^x$)$_2$—.

Further, it is more particularly preferable that $X^3$ represents —C($R^x$)$_2$— and $R^x$ is linked to $R^7$ and forms a ring.

L

L represents —CH$_2$=CH$_2$— or —CH$_2$— and —CH$_2$=CH$_2$— is preferable.

$R^1$ and $R^2$ $R^1$ and $R^2$ represent a hydrogen atom or a substituent group. As the substituent group, any one selected from the group Z of substituent groups described below can be used. $R^1$ and $R^2$ may be bonded to each other and form a ring.

$R^1$ and $R^2$ preferably represent a hydrogen atom or an alkyl group, more preferably represent a hydrogen atom, a methyl group, or an ethyl group, and still more preferably represent a hydrogen atom.

$R^3$ $R^3$ represents an alkyl group or a halogen atom. The preferable ranges of the alkyl group and the halogen atom are the same as those of an alkyl group and a halogen atom defined in the group Z of substituent groups described below. l1 showing the number of $R^3$'s represents an integer of 0 to 4, is preferably in a range of 1 to 4, and is more preferably 3 or 4. It is preferable that $R^3$ represents an alkyl group and more preferable that $R^3$ represents a methyl group or an ethyl group.

$R^4$ and $R^5$ $R^4$ and $R^5$ represent an alkyl group or a halogen atom or a group in which. $R^4$ and $R^5$ are linked to each other and form a ring together with $X^2$. The preferable ranges of the alkyl group and the halogen atom are the same as those of an alkyl group and a halogen atom defined in the group Z of substituent groups described below. The structure formed by $R^4$ and $R^5$ being linked to each other is not particularly limited, but it is preferable that the structure is a single bond, —O—, or —S—. m1 and n1 respectively showing the numbers of $R^4$'s and $R^5$'s represent an integer of 0 to 4, are preferably in a range of 1 to 4, and are more preferably 3 or 4.

In a case where $R^4$ and $R^5$ represent an alkyl group, it is preferable that $R^4$ and $R^5$ represent a methyl group or an ethyl group and also preferable that $R^4$ and $R^5$ represent trifluoromethyl.

$R^6$, $R^7$, and $R^8$ $R^6$, $R^7$, and $R^8$ represent a substituent group. Here, $R^7$ and $R^8$ may be bonded to each other and form a ring. l2, m2, and n2 respectively showing the numbers of these substituents represent an integer of 0 to 4, are preferably in a range of 0 to 2, and are more preferably 0 or 1.

$J^1$ $J^1$ represents a single bond or a divalent linking group. As the linking group, *—COO$^-$N$^+$R$^b$R$^c$R$^d$—** (R$^b$ to R$^d$ represent a hydrogen atom, an alkyl group, or an aryl group, and preferable ranges thereof are respectively the same as those described in the group Z of substituent groups described below), *—SO$_3^-$N$^+$R$^e$R$^f$R$^g$—** (R$^e$ to R$^g$ represent a hydrogen atom, an alkyl group, or an aryl group, and preferable ranges thereof are respectively the same as those described in the group Z of substituent groups described below), an alkylene group, or an arylene group is exemplified. The symbol "*" represents a binding site on the phenylene group side and the symbol "**" represents a binding site on the opposite side of the phenylene group. It is preferable that $J^1$ represents a single bond, a methylene group, or a phenylene group and a single bond is particularly preferable.

$A^1$ $A^1$ represents a group selected from —COOH, —OH, —SH, and —S(=O)$_2$OH. It is preferable that $A^1$ represents —COOH or —OH.

Examples of the group Z of substituent groups include:
an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methyl carbamoyl, diethyl carbamoyl, and phenyl carbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazino group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

In the polyimide which can be used in the present invention, the ratios of the respective repeating unit represented by Formula (I), (II-a), (II-b), (III-a), and (III-b) are not particularly limited and appropriately adjusted in consideration of gas permeability and gas separation selectivity according to the purpose of gas separation (recovery rate, purity, or the like).

In the polyimide which can be used in the present invention, a ratio ($E_{II}/E_{III}$) of the total number ($E_{II}$) of moles of respective repeating units represented by Formulae (II-a) and (II-b) to the total number ($E_{III}$) of moles of respective repeating units represented by Formulae (III-a) and (III-b) is preferably in a range of 5/95 to 95/5, more preferably in a range of 10/90 to 80/20, and still more preferably in a range of 20/80 to 60/40.

—Second Segment—

It is preferable that the second segment of the block copolymer is at least one selected from polydialkylsiloxane (preferably polydimethylsiloxane), poly(1-trimethylsilyl-1-propyne), and polyethylene oxide, more preferable that the second segment thereof is polydialkylsiloxane, and particularly preferable that the second segment thereof is polydimethylsiloxane. As a repeating unit constituting dialkylsiloxane, a repeating unit represented by —$\{O-Si-(CR_3)_2\}_n$— can be exemplified (R represents an alkyl group and preferably a methyl group, and n represents a natural number and is preferably a natural number of 1 to 100).

It is preferable that at least one terminal of dialkylsiloxane has an alkyl group.

In addition, in a case where dialkylsiloxane is used as a second segment, dialkylsiloxane may have a group derived from a functional group used for constituting a linking group that is bonded to the first segment.

For example, in a case where dialkylsiloxane used as the second segment has an aminoalkyl group at one terminal and an alkyl group at the other terminal, the block copolymer bonded to the first segment has an alkylene group, which is a group derived from a functional group used for constituting a linking group bonded to the first segment, at one terminal and an alkyl group at the other terminal.

—Cross-Linked Polyimide Component—

In a case where the block copolymer includes a polyimide segment or a case where the block copolymer includes a polyimide resin (also referred to as a polyimide component) as another resin, a polyimide component in the separation layer may be cross-linked. The cross-linked polyimide component includes divalent to tetravalent metal atoms as the central metal and has a structure in which two to four molecules of polyimide components are coordinated (bonded) with each other with respect to the central metal. The polyimide components are coordinated with the central metal through an oxygen atom or a sulfur atom. More preferably, the polyimide components are coordinated with the central metal through an oxygen atom or a sulfur atom obtained by desorbing a hydrogen atom from an active hydrogen-containing group included in the polyimide component, for example, —COOH—, —OH, —SH, or —S(=O)$_2$OH. When the coordination number (Np) in which the polyimide components are coordinated with the central metal is less than the number (Nq) in which the polyimide components can be coordinated with the central metal, the central metal has (Nq−Np) ligands selected from an alkoxy group, an aryloxy group, a carboxylate group, a sulfate group, a cyano group, an ammonium group, a phosphate group, β-diketone, β-ketoester, and a halogen atom. These ligands are ligands included in a metal complex described below.

The polyimide components coordinated with the central metal may be the same as or different from each other.

The cross-linked polyimide component of the present invention may have a structure having a plurality of central metals. In this case, the plurality of central metals are linked to polyimide components through a polyimide chain. That is, in a case where the cross-linked polyimide component includes a plurality of central metals, some or all of the polyimide components are present as bridging ligands. The number of central metals of the cross-linked polyimide component in the present invention is not particularly limited and the number is preferably in a range of 1 to 300, more preferably in a range of 1 to 200 from a viewpoint of suppressing precipitation at the time of preparing a liquid, and still more preferably in a range of 1 to 150. The plurality of central metals may be the same as or different from each other.

The central metal is a divalent to tetravalent metal atom, preferably a trivalent or tetravalent metal atom, and more preferably a trivalent metal atom. Examples of the central metal include Be, Mg, Ca, Sc, Y, Ti, Zr, V, Cr, Mo, Mn, Fe, Co, Ni, Cu, Zn, B, Al, Ga, and In. Among these, Al, Ga, or In is preferable. Typically, the polyimide components can be coordinated only by the number of the valence of metal atoms. Accordingly, in the structure of the cross-linked polyimide component of the present invention, the number of polyimide components coordinated with the central metal is typically "2 to (the valence of the central metal)," but the present invention is not limited thereto.

In the present invention, it is preferable that the metal crosslinking of the polyimide component is performed with the formation of the separation layer. The details thereof will be described in the section of a method of producing a gas separation membrane described below.

—Molecular Weight—

The molecular weight of the block copolymer which can be used in the present invention is preferably in a range of 10,000 to 1,000,000, more preferably in a range of 15,000 to 500,000, and still more preferably in a range of 20,000 to 200,000 as the weight average molecular weight.

The molecular weight and the dispersity in the present specification are set to values measured using a gel permeation chromatography (GPC) method unless otherwise specified and the molecular weight is set to a weight average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 mL/min to 2 mL/min and most preferable that the measurement is performed at a flow rate thereof of 0.5 mL/min to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

—Synthesis of Block Copolymer—

The block copolymer which can be used in the present invention can be synthesized by performing condensation and polymerization of various monomers, oligomers, and polymers used for the first segment and the second segment of the block copolymer. For example, the block copolymer can be synthesized by condensation and polymerization of a specific bifunctional acid anhydride (tetracarboxylic dianhydride), a specific diamine, and a specific monofunctional amine. As the method, a technique described in a general book (for example, "*The Latest Polyimide~Fundamentals and Applications~*" edited by Toshio Imai and Rikio Yokota, NTS Inc., pp. 3 to 49) can be appropriately selected.

—Materials of First Segment—

It is preferable that a tetracarboxylic dianhydride is used as a raw material of the block copolymer which can be used in the present invention. It is preferable that at least one tetracarboxylic dianhydride used as a raw material is represented by the following Formula (VI). It is more preferable that all tetracarboxylic dianhydrides used as raw materials are represented by the following Formula (VI).

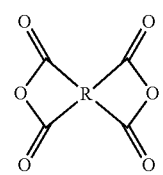

Formula (VI)

In Formula (VI), R has the same definition as that for R in Formula (I).

Specific examples of the tetracarboxylic dianhydride which can be used in the present invention include the followings. Among those, a tetracarboxylic dianhydride which is a material of a block copolymer A described below and is represented by Anhydride-9 can be preferably used.

Anhydride-1

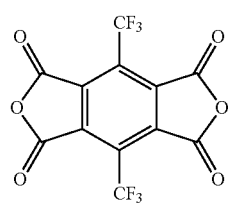

Anhydride-2

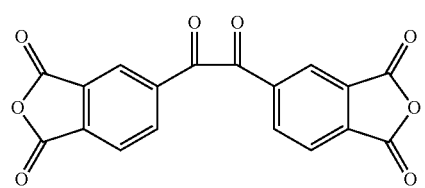

Anhydride-3

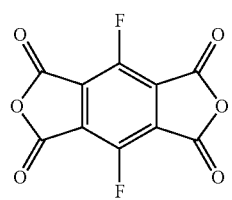

Anhydride-4

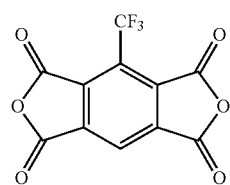

Anhydride-5

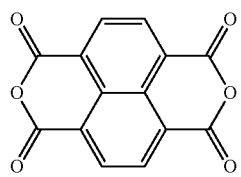

Anhydride-6

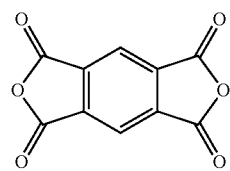

Anhydride-7

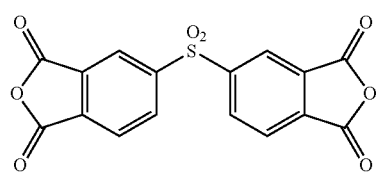

Anhydride-8

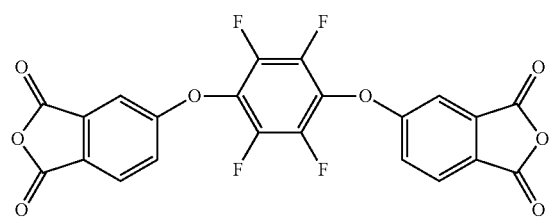

-continued

Anhydride-9, Anhydride-10, Anhydride-11, Anhydride-12, Anhydride-13, Anhydride-14, Anhydride-15, Anhydride-16, Anhydride-17, Anhydride-18, Anhydride-19, Anhydride-20, Anhydride-21, Anhydride-22, Anhydride-23, Anhydride-24

-continued
Anhydride-25
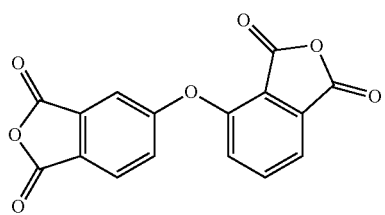
Anhydride-26
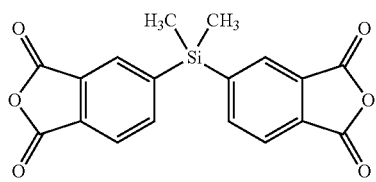
Anhydride-27
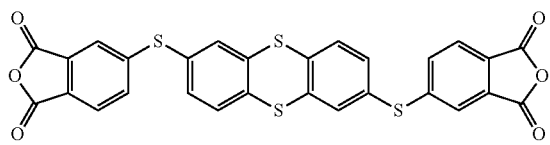
Anhydride-28
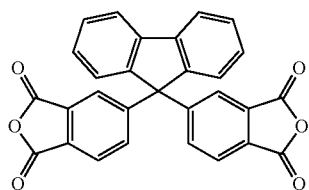
Anhydride-29
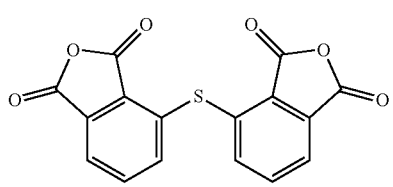
Anhydride-30
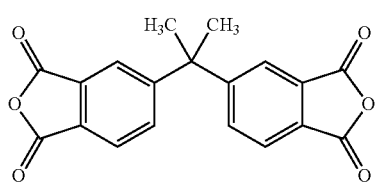
Anhydride-31
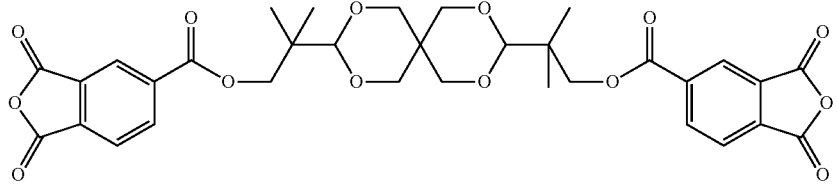
Anhydride-32
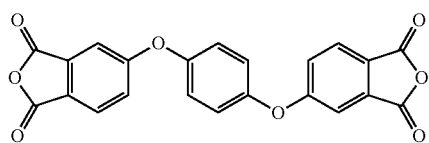
Anhydride-33
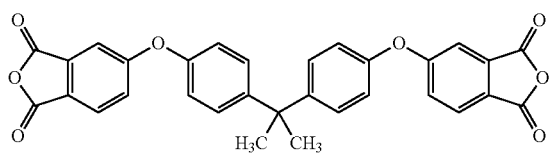
Anhydride-34
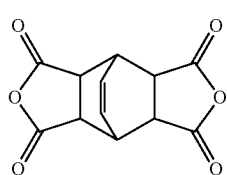
Anhydride-35
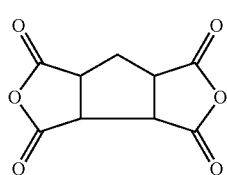
Anhydride-36
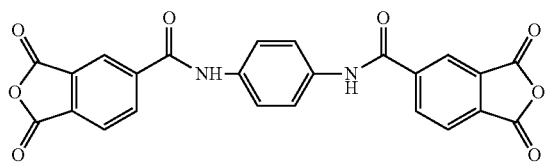
Anhydride-37
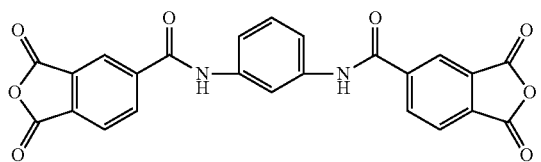
Anhydride-38
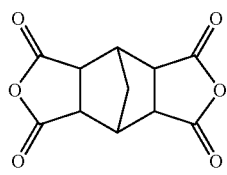
Anhydride-39
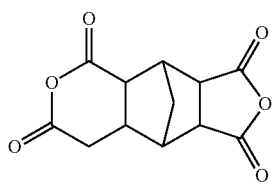

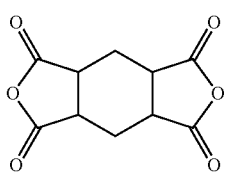

Anhydride-40

In a case where the block copolymer which can be used in the present invention has a polyimide segment, it is preferable that a diamine compound is used as a raw material of the block copolymer. It is preferable that at least one diamine compound used as a raw material is represented by the following Formula (VII-a) or (VII-b), or (VIII-a) or (VIII-b). It is more preferable that all diamine compounds used as raw materials are represented by any of the following Formulae (VII-a), (VII-b), (VIII-a), and (VIII-b).

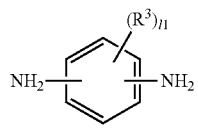

Formula (VII-a)

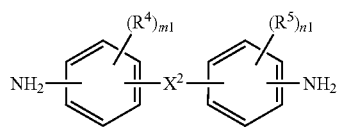

Formula (VII-b)

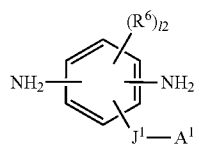

Formula (VIII-a)

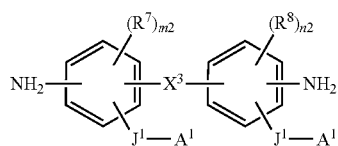

Formula (VIII-b)

Respective symbols in Formulae (VII-a) and (VII-b) have the same definitions as those for respective symbols in Formulae (II-a) and (II-b). Further, respective symbols in Formulae (VIII-a) and (VIII-b) have the same definitions as those for respective symbols in Formulae (III-a) and (III-b).

Specific examples of the diamine compound which can be used in the present invention include the followings. Among those, a diamine which is a material of a block copolymer A described below and is represented by diamine A can be preferably used.

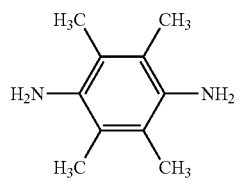

Diamine-1

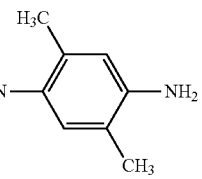

Diamine-2

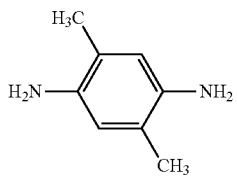

Diamine-3

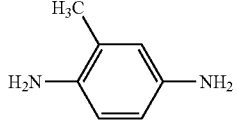

Diamine-4

Diamine-5

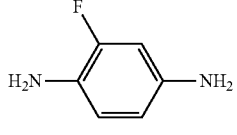

Diamine-6

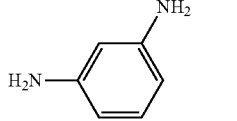

Diamine-7

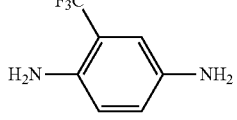

Diamine-8

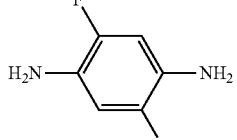

Diamine-9

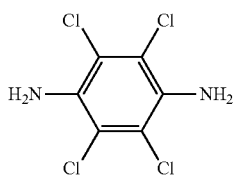

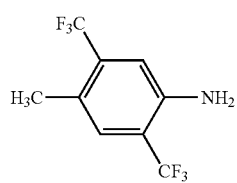
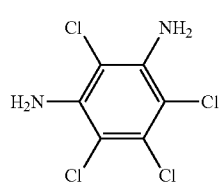
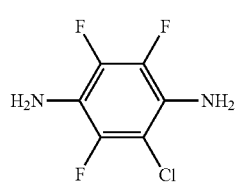
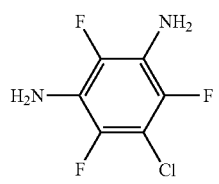
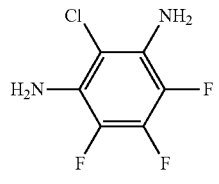
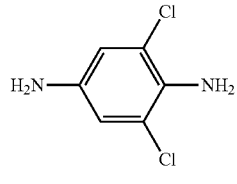
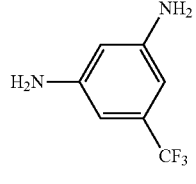
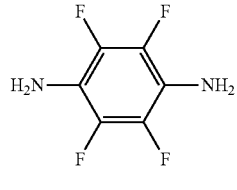
Diamine-10 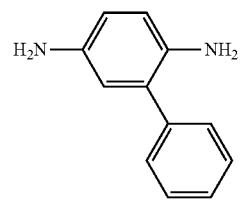
Diamine-11 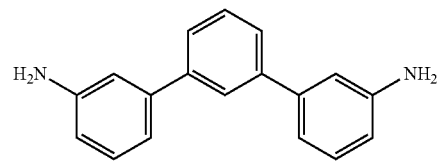
Diamine-12 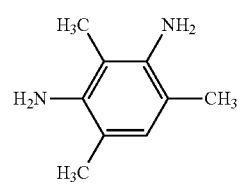
Diamine-13 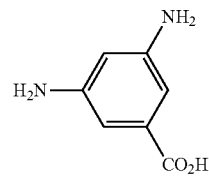
Diamine-14 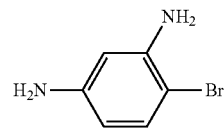
Diamine-15 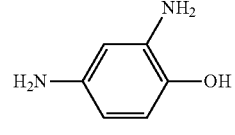
Diamine-16 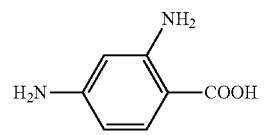
Diamine-17 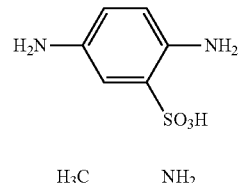
Diamine-18
Diamine-19
Diamine-20
Diamine-31
Diamine-32
Diamine-33
Diamine-34
Diamine-35
Diamine-36 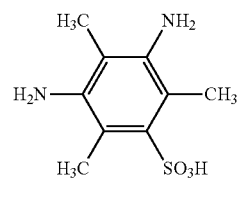

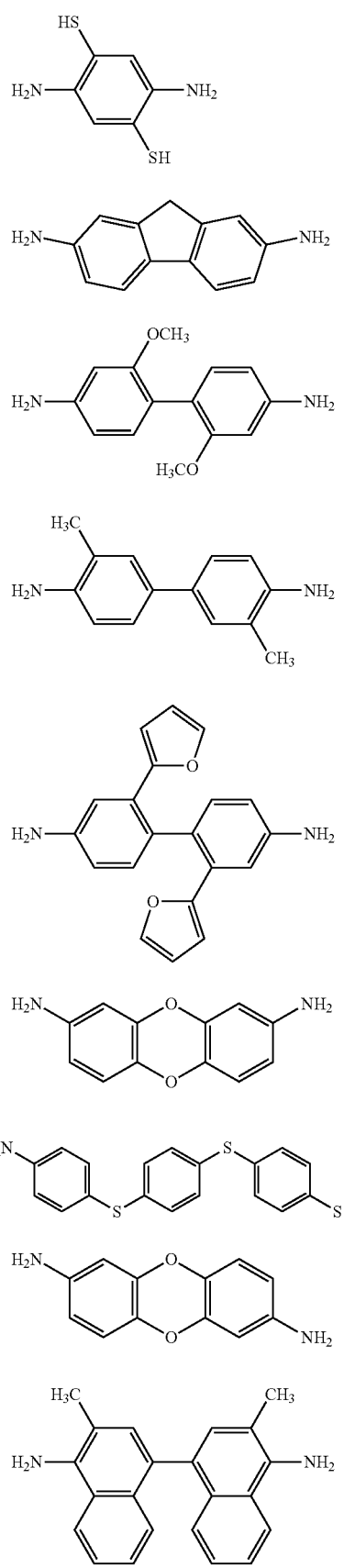
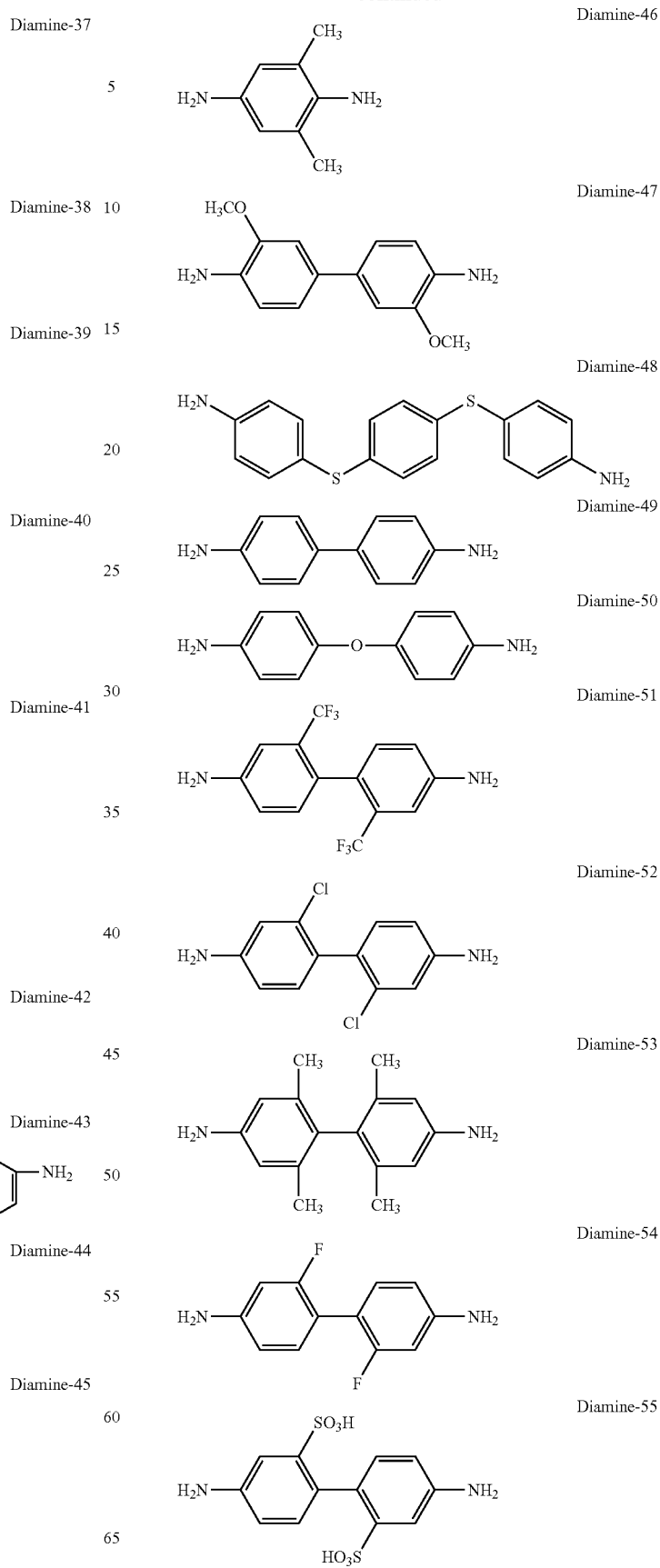

Diamine-56
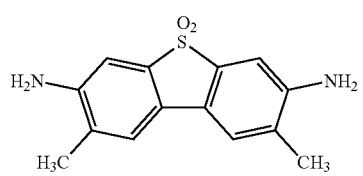

Diamine-57
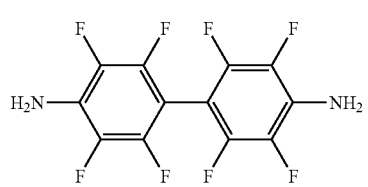

Diamine-58
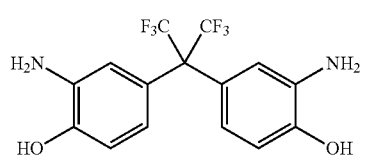

Diamine-59
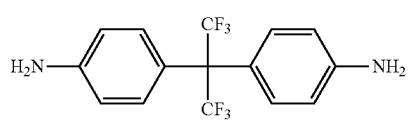

Diamine-60
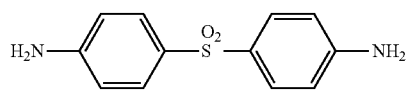

Diamine-61
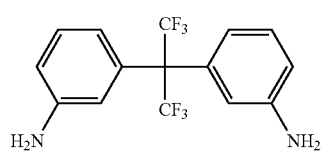

Diamine-62
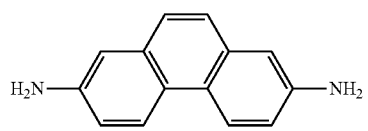

Diamine-63
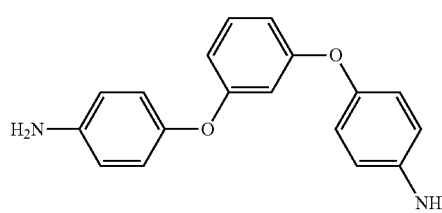

Diamine-64
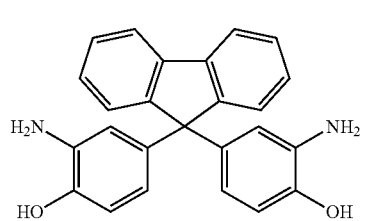

Diamine-65
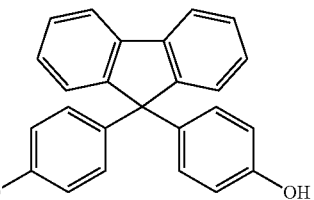

Diamine-66
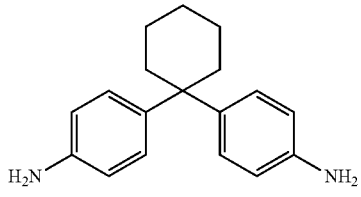

Diamine-67
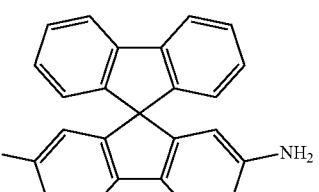

Diamine-68
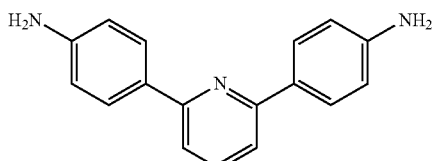

Diamine-69
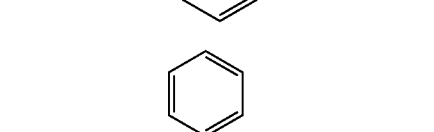

Diamine-70
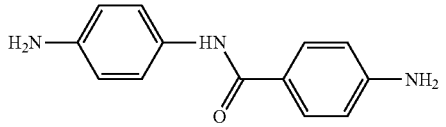

Diamine A
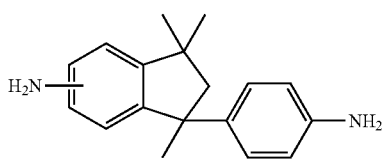

—Material of Second Segment—

In a case where the block copolymer which can be used in the present invention has a polydialkylsiloxane segment as the second segment, it is preferable that a polydialkylsiloxane compound having an amine at one terminal of the molecular chain is used as a raw material of the block copolymer. Examples of the commercially available product thereof include MCR-A11 (one terminal amino group-modified polydimethylsiloxane, manufactured by Gelest, Inc.).

As the polydialkylsiloxane compound which can be used in the present invention and has an amine at one terminal of the molecular chain, a compound represented by the following General Formula (P) can be exemplified.

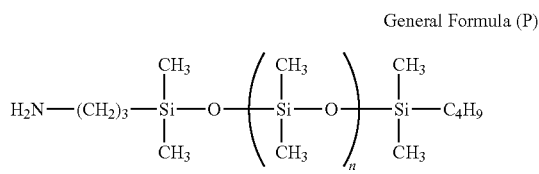

General Formula (P)

Preferred specific examples of the block copolymer which can be used in the present invention are as follows, but the present invention is not limited thereto. "m" and "n" represent the number of repeating units and are natural numbers.

Block copolymer A: molecular weight of the first segment of $1.01 \times 10^5$ and molecular weight of the second segment of $1.53 \times 10^4$ Block copolymer B: molecular weight of the first segment of $4.87 \times 10^4$ and molecular weight of the second segment of $5.96 \times 10^3$ Block copolymer C: molecular weight of the first segment of $1.19 \times 10^5$ and molecular weight of the second segment of $4.61 \times 10^4$ within the range in which a tetracarboxylic dianhydride and a diamine compound which are reaction substrates, polyamic acid which is a reaction intermediate, and a polyimide compound which is a final product can be dissolved. Among these, an ester-based organic solvent (preferably butyl acetate), aliphatic ketone (preferably methyl ethyl ketone, methyl isobutyl ketone, diacetone alcohol, cyclopentanone, or cyclohexanone), an ether-based organic solvent (diethylene glycol monomethyl ether or methyl cyclopentyl ether), an amide-based organic solvent, or a sulfur-containing organic solvent (dimethyl sulfoxide or sulfolane) is preferable. In addition, these can be used alone or in combination of two or more kinds thereof.

A temperature which can be typically employed for the synthesis of the block copolymer can be employed without being particularly limited to the polymerization reaction temperature. Specifically, the temperature is preferably in a range of −40° C. to 60° C. and more preferably in a range of −30° C. to 50° C.

The block copolymer including a polyimide component can be obtained by imidizing polyamic acid, which is generated by the above-described polymerization reaction, through a dehydration ring-closure reaction in a molecule. As a method of the dehydration ring-closure reaction, a method described in a general book (for example, "*The Latest Polyimide~Fundamentals and Applications~*" edited by Toshio Imai and Rikio Yokota, NTS Inc., pp. 3 to 49) can be used as reference. A thermal imidization method of performing heating in a temperature range of 120° C. to 200° C. and removing water generated as a by-product to the

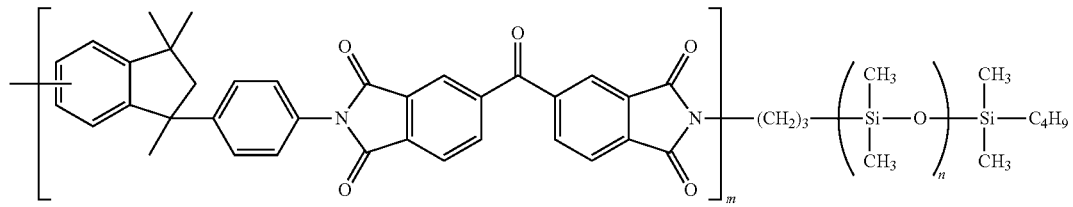

Block copolymers A, B, and C

An oligomer or a prepolymer may be used as a monomer represented by Formula (VI), (VII-a), (VIII-a), or (VIII-b). A polymer used to obtain a polymer compound may be a copolymer in any form of a block copolymer, a random copolymer, and a graft copolymer. From viewpoints of the viscosity and compatibility, a block copolymer or a graft copolymer is particularly preferable.

The block copolymer which can be used in the present invention can be obtained by mixing the above-described respective raw materials in a solvent and performing condensation and polymerization using a typical method.

The solvent is not particularly limited. Examples thereof include an ester-based organic solvent such as methyl acetate, ethyl acetate, or butyl acetate; aliphatic ketone such as acetone, methyl ethyl ketone, methyl isobutyl ketone, diacetone alcohol, cyclopentanone, or cyclohexanone; an ether-based organic solvent such as ethylene glycol dimethyl ether, dibutyl butyl ether, tetrahydrofuran, methyl cyclopentyl ether, or dioxane; an amide-based organic solvent such as N-methylpyrrolidone, 2-pyrrolidone, dimethylformamide, dimethylimidazolidinone, or dimethylacetamide; and a sulfur-containing organic solvent such as dimethyl sulfoxide or sulfolane. These organic solvents can be suitably selected outside the system for a reaction or a so-called chemical imidization method in which a dehydrating condensation agent such as an acetic anhydride, dicyclohexylcarbodiimide, or triphenyl phosphite is used in the coexistence of a basic catalyst such as pyridine, trimethylamine, or DBU is preferably used.

In the present invention, the total concentration of the tetracarboxylic dianhydride and the diamine compound in the polymerization reaction solution of the block copolymer is not particularly limited. The total concentration thereof is preferably in a range of 5% by mass to 70% by mass, more preferably in a range of 5% by mass to 50% by mass, and still more preferably in a range of 5% by mass to 30% by mass.

(Other Resins)

The separation layer may include other resins in addition to the block copolymer as long as it is within the gist of the present invention. Examples of other resins include the followings, but are not limited thereto. Preferred specific examples include an acrylic polymer, a polyurethane resin, polyimides, polyamides, a polyester resin, an epoxy resin, a phenol resin, a polycarbonate resin, a polyvinyl butyral resin, a polyvinyl formal resin, shellac, a vinyl resin, an acrylic resin, a rubber resin, waxes, other natural resins, celluloses, polyethylene glycols, and polybenzoxazoles. In addition, these may be used in combination of two or more kinds thereof.

In the gas separation membrane of the present invention, in a case where the separation layer has other resins in addition to the block copolymer, it is more preferable that the separation layer further has at least one homopolymer selected from polyimide, polybenzoxazole, and cellulose acetate and particularly preferable that the separation layer further has polyimide, from the viewpoint of improving the gas separation selectivity. These preferable resins are highly compatible with the first segment that forms the first structure of the block copolymer and can further improve the gas separation selectivity of the separation layer.

Moreover, commercially available products may be used as other resins. Alternatively, other resins can be selected from polyimides such as MATRIMID 5218 (indicating a specific polyimide polymer that is put on the market under the trade mark of MATRIMID (registered trademark)) that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH; celluloses such as cellulose acetate, cellulose triacetate, cellulose acetate butyrate, cellulose propionate, ethyl cellulose, methyl cellulose, and nitrocellulose; polydimethylsiloxanes; polyethylene glycols such as a polymer obtained by polymerizing polyethylene glycol #200 diacrylate (manufactured by Shin-Nakamura Chemical Co., Ltd.); and a polymer described in JP2010-513021A.

(Structure of Separation Layer)

The spherical second structure satisfies the following Formula 1, preferably the following Formula 1A, and more preferably the following Formula 1B.

$$R/L<0.4 \qquad \text{Formula 1:}$$

$$0.0010<R/L<0.35 \qquad \text{Formula 1A:}$$

$$0.010<R/L<0.30 \qquad \text{Formula 1B:}$$

(In Formulae 1, 1A, and 1B, R represents the average diameter (unit: nm) of the spherical second structure and L represents the thickness (unit: nm) of the separation layer)

The average diameter R of the spherical second structure 12 is preferably in a range of 2 nm to 50 nm, more preferably 4 nm to less than 40 nm, particularly preferably 5 nm to less than 35 nm, and more particularly preferably 10 nm to less than 30 nm.

It is preferable that the thickness L of the separation layer is as small as possible under the conditions of maintaining the mechanical strength and gas separation selectivity and imparting high gas permeability.

It is preferable that the separation layer of the gas separation membrane of the present invention is a thin layer from the viewpoint of improving the gas permeability. The thickness of the separation layer is typically 10 µm or less, preferably 1,000 nm or less from the viewpoint of thinning the separation layer to the extent that a defect is not generated in a portion of the membrane, more preferably 500 nm or less, and particularly preferably 200 nm or less.

Further, the thickness of the separation layer is typically 10 nm or greater, preferably 30 nm or greater, more preferably 50 nm or greater, and particularly preferably 70 nm or greater from the practical viewpoint of ease of performing uniform coating when the separation layer is formed through coating. Here, when the separation layer is formed through coating, it becomes difficult to perform uniform coating if the coating layer has a certain thickness or less and thus there is a problem that a defect in a portion of the membrane easily occurs. According to the gas separation membrane of the present invention which uses a block copolymer, the gas separation selectivity can be maintained even in the case where the separation layer is formed through coating, the gas permeability can be improved even in a case of the same thickness of coating, and thus a defect is not generated in the membrane of the separation layer.

In the obtained gas separation membrane, the variation coefficient of the thickness of the separation layer is preferably 1 or less, more preferably 0.5 or less, and still more preferably 0.3 or less. The variation coefficient is a value calculated by randomly selecting 10 sites for measuring the film thickness, which are separated from each other by a distance of 1 cm or greater, in the separation layer constituting the gas separation membrane and performing measurement of the film thickness on these sites.

(Characteristics of Separation Layer)

As the permeability coefficients (unit: Barrer) of the first structure and the spherical second structure, values obtained by separately preparing single layer films of respective homopolymers thereof and measuring the permeability coefficients of the single layer films are used. The permeability coefficient of a gas having a greater permeability coefficient in the first structure among two kinds of gases is set as Ps with respect to the first structure and set as Pf with respect to the second structure. Further, the permeability coefficient of a gas having a smaller permeability coefficient in the first structure among two kinds of gases is set as Ps2 with respect to the first structure and set as Pf2 with respect to the second structure.

At this time, the first structure and the spherical second structure satisfy the following Formula 2, preferably the following Formula 2A, and more preferably the following Formula 2B.

$$Ps/Pf<1 \qquad \text{Formula 2:}$$

$$Ps/Pf<0.7 \qquad \text{Formula 2A:}$$

$$Ps/Pf<0.1 \qquad \text{Formula 2B:}$$

The permeability coefficient Ps (unit: Barrer) of the first structure is preferably in a range of 30 Barrer to 1,000 Barrer, more preferably in a range of 100 Barrer to 800 Barrer, and particularly preferably in a range of 200 Barrer to 600 Barrer. As the permeability coefficients Ps of the first structure, a value obtained by separately preparing a single layer film of a homopolymers of the first segment of the block copolymer A and measuring the permeability coefficients of the single layer film is used.

The permeability coefficient Pf (unit: Barrer) of the spherical second structure is preferably in a range of 1,000 Barrer to 10,000 Barrer, more preferably in a range of 2,000 Barrer to 9,000 Barrer, and particularly preferably in a range of 3,000 Barrer to 7,000 Barrer.

The first structure and the spherical second structure satisfy preferably the following Formula 3, more preferably the following Formula 3A, and particularly preferably the following Formula 3B.

$$\alpha s/\alpha f>3 \qquad \text{Formula 3:}$$

$$\alpha s/\alpha f>8 \qquad \text{Formula 3A:}$$

$$\alpha s/\alpha f>10 \qquad \text{Formula 3B:}$$

(In Formulae 3, 3A, and 3B, αs represents the gas separation selectivity of the first structure and is represented by "αs=Ps/Ps2" and αf represents the gas separation selectivity of the spherical second structure and is represented by "αf=Pf/Pf2." In this case, αs and αf represent the gas separation selectivity for gas mixtures consisting of two kinds of gases and having the same composition.)

The gas separation selectivity αs of the first structure is preferably 15 or greater, more preferably 20 or greater, and particularly preferably 25 or greater.

The gas separation selectivity αf of the spherical second structure is preferably in a range of 1 to 10, more preferably in a range of 1 to 5, and particularly preferably in a range of 2 to 4.

The volume fraction of the spherical second structure with respect to the separation layer is preferably 0.01 to less than 0.28, more preferably in a range of 0.05 to 0.25, and particularly preferably in a range of 0.10 to 0.22. A ratio of the area of the figure corresponding to the spherical second structure 12 to the area corresponding to the separation layer in the SEM image showing the section of the separation layer of the gas separation membrane is used as the volume fraction of the spherical second structure with respect to the separation layer.

<Protective Layer>

It is preferable that the gas separation membrane of the present invention comprises a protective layer formed on the separation layer. The protective layer is a layer disposed on the separation layer. At the time of handling or use, unintended contact between the separation layer and other materials can be prevented.

(Materials)

The materials of the protective layer are not particularly limited and preferable ranges of the materials used for the protective layer are the same as those of preferable materials used for a resin layer described below. Particularly, it is preferable that the protective layer is at least one selected from polydimethylsiloxane (hereinafter, also referred to as PDMS), poly(1-trimethylsilyl-1-propyne) (hereinafter, also referred to as PTMSP), and polyethylene oxide, more preferable that the protective layer is polydimethylsiloxane or poly(1-trimethylsilyl-1-propyne), and particularly preferable that the protective layer is polydimethylsiloxane.

(Characteristics)

The film thickness of the protective layer is preferably in a range of 20 nm to 1 μm, more preferably in a range of 30 nm to 0.8 μm, and particularly preferably in a range of 40 nm to 0.7 μm.

<Support>

It is preferable that the gas separation membrane of the present invention includes a support and the separation layer is formed on the support. Since the gas permeability can be sufficiently secured, it is preferable that the support is thin and is formed of a porous material.

The gas separation membrane of the present invention may be obtained by forming and arranging the separation layer on the surface or inner surface of the porous support or may be a thin film composite conveniently obtained by forming the separation layer at least on the surface thereof. When the separation layer is formed at least on the surface of the porous support, a gas separation membrane with an advantage of comprising high gas separation selectivity, high gas permeability, and mechanical strength at the same time can be obtained.

In a case where the gas separation membrane of the present invention is a thin film composite, it is preferable that the thin film composite is formed by coating (the term "coating" in the present specification includes a form made by a coating material being adhered to a surface through immersion) at least the surface of the porous support with a coating solution (dope) that forms the above-described separation layer. Specifically, it is preferable that the support has a porous layer on the separation layer side, more preferable that the support is a laminate formed of non-woven fabric and a porous layer arranged on the separation layer side, and particularly preferable that the support is formed of non-woven fabric and a porous layer provided on at least one surface of the non-woven fabric.

The material of the porous layer which is preferably applied to the support is not particularly limited and may be an organic or inorganic material as long as the material satisfies the purpose of providing mechanical strength and high gas permeability. A porous membrane of an organic polymer is preferable, and the thickness thereof is in a range of 1 μm to 3,000 μm, preferably in a range of 5 μm to 500 μm, and more preferably in a range of 5 μm to 150 μm. In regard to the pore structure of the porous layer, the average pore diameter is typically 10 μm or less, preferably 0.5 μm or less, and more preferably 0.2 μm or less. The porosity is preferably in a range of 20% to 90% and more preferably in a range of 30% to 80%. Further, the molecular weight cut-off of the porous layer is preferably 100,000 or less. Moreover, the gas permeability is preferably $3 \times 10^{-5}$ cm$^3$ (STP: STP is an abbreviation for standard temperature and pressure)/cm$^2$·cm·sec·cmHg (30 GPU: GPU is an abbreviation for gas permeation unit) or greater in terms of the permeation rate of carbon dioxide. Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, and polyaramid. As the shape of the porous layer, any of a flat shape, a spiral shape, a tabular shape, and a hallow fiber shape can be employed.

In the thin film composite, it is preferable that woven fabric, non-woven fabric, or a net used to further provide mechanical strength is formed in the lower portion of the porous layer preferably arranged on the separation layer side. In terms of film forming properties and the cost, non-woven fabric is preferably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Resin Layer>

In the case where the gas separation membrane of the present invention is a thin film composite, it is preferable that a resin layer is included between the separation layer and the support.

The resin layer is a layer including a resin. It is preferable that the resin has a functional group which can be bonded to a metal.

Examples of such a functional group include an epoxy group, an oxetane group, a carboxyl group, an amino group, a hydroxyl group, and a thiol group. It is more preferable that the resin layer includes an epoxy group, an oxetane group, a carboxyl group, and a resin having two or more groups among these groups. It is preferable that such a resin is formed by being cured by irradiating a radiation-curable composition on a support with radiation.

Polymerizable dialkylsiloxane is a monomer having a dialkylsiloxane group, a polymerizable oligomer having a dialkylsiloxane group, or a polymer having a dialkylsiloxane group. The resin layer may be formed from a partially cross-linked radiation-curable composition having a dialkylsiloxane group. As the dialkylsiloxane group, a group represented by —{O—Si(CH$_3$)$_2$}$_n$— (n represents a number of 1 to 100) can be exemplified. A poly(dialkylsiloxane) compound having a vinyl group at the terminal can be preferably used.

It is preferable that the material of the resin layer is at least one selected from polydimethylsiloxane, poly(1-trimethylsilyl-1-propyne), and polyethylene oxide, more preferable that the material thereof is polydimethylsiloxane or poly(1-trimethylsilyl-1-propyne), and particularly preferable that the material thereof is polydimethylsiloxane.

Commercially available materials can be used as the material of the resin layer and preferred examples thereof include UV9300 (polydimethylsiloxane (PDMS), manufactured by Momentive Performance Materials Inc.) and UV9380C (bis(4-dodecylphenyl)iodonium hexafluoroantimonate, manufactured by Momentive Performance Materials Inc.).

The material of the resin layer can be prepared as a composition including an organic solvent when the resin layer is formed, and it is preferable that the material thereof is a curable composition.

The film thickness of the resin layer is not particularly, limited, but the film thickness thereof is preferably in a range of 25 nm to 1,200 nm, more preferably in a range of 30 nm to 800 nm, and particularly preferably in a range of 50 nm to 650 nm. For example, the film thickness of the resin layer can be set to be in a range of 70 nm to 120 nm, 130 nm to 170 nm, 180 nm to 220 nm, 230 nm to 270 nm, 300 nm to 360 nm, 380 nm to 450 nm, 470 nm to 540 nm, or 560 nm to 630 nm. The film thickness of the resin layer can be acquired by SEM.

The film thickness of the resin layer can be controlled by adjusting the coating amount of the curable composition.

<Characteristics and Applications>

The separation membrane of the present invention can be suitably used according to a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane or ethane; unsaturated hydrocarbon such as propylene; or a perfluoro compound such as tetrafluoroethane can be obtained.

It is preferable that the gas separation membrane of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide (SOx), and a nitrogen oxide (NOx). Among these, at least one selected from carbon dioxide, hydrogen sulfide, carbonyl sulfide, a sulfur oxide (SOx), and a nitrogen oxide (NOx) is preferable; carbon dioxide, hydrogen sulfide, or a sulfur oxide (SOx) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable.

It is preferable that the gas separation membrane of the present invention selectively separates carbon dioxide from the gas mixture including particularly carbon dioxide and hydrocarbon (methane).

In addition, in a case where gas subjected to a separation treatment is mixed gas of carbon dioxide and methane, the permeation rate of the carbon dioxide at 40° C. and 4 MPa is preferably greater than 20 GPU and more preferably in a range of 20 GPU to 300 GPU. Further, 1 GPU is 1×10$^{-6}$ cm$^3$(STP)/cm$^2$·sec·cmHg.

In the case where the gas separation membrane of the present invention is a membrane in which the gas subjected to a separation treatment is mixed gas of carbon dioxide and methane, a gas separation selectivity α which is a ratio of the permeation flux of carbon dioxide at 40° C. and 4 MPa to the permeation flux of methane is preferably 15 or greater, more preferably 20 or greater, and particularly preferably 25 or greater.

It is considered that a mechanism of dissolution and diffusion in a membrane is involved in the selective gas permeation. From this viewpoint, a separation membrane including a polyethyleneoxy (PEO) composition is examined (see Journal of Membrane Science, 160 (1999), pp. 87 to 99). This is because interaction between carbon dioxide and the polyethyleneoxy composition is strong. Since this polyethyleneoxy film is a flexible rubber-like polymer film having a low glass transition temperature, a difference in the diffusion coefficient resulting from the kind of gas is small and the gas separation selectivity is mainly due to the effect of a difference in solubility. Meanwhile, in a case where the block copolymer applied to the separation layer has a polyimide segment as a first segment, that is, the glass transition temperature is high, the gas separation membrane of the present invention can be significantly improved from the viewpoint of the thermal durability of the separation layer while the above-described action of dissolution and diffusion is exhibited.

<Method of Producing Gas Separation Membrane>

A method of producing the gas separation membrane is not particularly limited and can be produced according to a known method.

It is preferable that the method of producing the gas separation membrane includes a process of forming a separation layer, a process of performing a surface treatment on one surface of the separation layer, and a process of forming a protective layer on the surface of the separation layer subjected to the surface treatment.

(Formation of Separation Layer)

The method of forming the separation layer is not particularly limited and can be formed using a block copolymer according to a known method.

The method of forming the separation layer is not particularly limited, but it is preferable that a coating solution is prepared by mixing at least a block copolymer into an organic solvent and a lower layer (for example, a support layer or a resin layer) is coated with the coating solution. The coating method is not particularly limited and the coating can be performed according to a known method, for example, a spin coating method.

The concentration of the block copolymer in the coating solution at the time of coating is preferably in a range of 0.1% by mass to 20.0% by mass, more preferably in a range of 0.2% by mass to 10.0% by mass, and still more preferably in a range of 0.5% by mass to 5.0% by mass.

—Organic Solvent—

The organic solvent serving as a medium of the coating solution is not particularly limited. Examples thereof include a hydrocarbon-based organic solvent such as n-hexane or n-heptane; an ester-based organic solvent such as methyl acetate, ethyl acetate, or butyl acetate; lower alcohol such as methanol, ethanol, n-propanol, isopropanol, n-butanol, isobutanol, or tert-butanol; aliphatic ketone such as acetone, methyl ethyl ketone, methyl isobutyl ketone, diacetone alcohol, cyclopentanone, or cyclohexanone; an ether-based organic solvent such as ethylene glycol, diethylene glycol, triethylene glycol, glycerin, propylene glycol, ethylene glycol monomethyl or monoethyl ether, propylene glycol methyl ether, dipropylene glycol methyl ether, tripropylene glycol methyl ether, ethylene glycol phenyl ether, propylene glycol phenyl ether, diethylene glycol monomethyl or monoethyl ether, diethylene glycol monobutyl ether, triethylene glycol monomethyl or monoethyl ether, dibutyl butyl ether, tetrahydrofuran, methyl cyclopentyl ether, or dioxane; N-methylpyrrolidone; 2-pyrrolidone; dimethylformamide; dimethylimidazolidinone; dimethyl sulfoxide; and dimethylacetamide. Among these organic solvents, an organic solvent serving as a good solvent of the first segment and serving as a poor solvent of the second segment of the block copolymer is preferable from the viewpoint that the second structure derived from the second segment can be easily formed to have a spherical form. Specifically, aliphatic ketone is more preferable, methyl ethyl ketone, methyl isobutyl ketone, diacetone alcohol, cyclopentanone, or cyclohexanone is particularly preferable, and methyl ethyl ketone is more particularly preferable. In addition, these can be used alone or in combination of two or more kinds thereof.

Moreover, the first structure and the spherical second structure can be respectively formed by the first segment and the second segment of the block copolymer without any special operation. As described above, when a solvent serving as a good solvent of the first segment and serving as a poor solvent of the second segment of the block copolymer is used, the first structure and the spherical second structure can be produced with excellent dispersibility, the amount of a solvent to be contained when the spherical second structure is formed to be spherical can be reduced, and the spherical structure is easily maintained even after the coating is dried.

—Other Components and the Like—

Moreover, a nonionic surfactant, a cationic surfactant, or an organic fluoro compound can be added to adjust the physical properties of the coating solution.

Specific examples of the surfactant include anionic surfactants such as alkyl benzene sulfonate, alkyl naphthalene sulfonate, higher fatty acid salts, sulfonate of higher fatty ester, sulfuric ester salts of higher alcohol ether, sulfonate of higher alcohol ether, alkyl carboxylate of higher alkyl sulfonamide, and alkyl phosphate; non-ionic surfactants such as polyoxyethylene alkyl ether, polyoxyethylene alkyl phenyl ether, polyoxyethylene fatty acid ester, sorbitan fatty acid ester, an ethylene oxide adduct of acetylene glycol, an ethylene oxide adduct of glycerin, and polyoxyethylene sorbitan fatty acid ester; and amphoteric surfactants such as alkyl betaine and amide betaine; a silicon-based surfactant; and a fluorine-based surfactant, and the surfactant can be suitably selected from known surfactants and derivatives thereof.

Further, specific examples of the polymer dispersant include polyvinyl pyrrolidone, polyvinyl alcohol, polyvinyl methyl ether, polyethylene oxide, polyethylene glycol, polypropylene glycol, and polyacrylamide. Among these, polyvinyl pyrrolidone is preferably used.

The conditions of forming the separation layer of the gas separation membrane of the present invention are not particularly limited. The temperature thereof is preferably in a range of −30° C. to 100° C., more preferably in a range of −10° C. to 80° C., and particularly preferably in a range of 5° C. to 50° C.

In the present invention, when the separation layer is formed, gas such as air or oxygen may be allowed to coexist. It is desired that the separation layer is formed under an inert gas atmosphere.

<Surface Modification Treatment of Separation Layer>

A method of producing the gas separation membrane may include a process of performing a surface modification treatment on one surface of the separation layer.

As the method of surface modification, (1) a plasma treatment, an electron beam irradiation treatment, a UV irradiation treatment, a UV ozone irradiation treatment, or a corona discharge treatment; (2) a method of performing a hydrophilic silane coupling treatment after the treatment (1); (3) vapor deposition and sputtering using a metal oxide; or (4) a chemical etching treatment can be exemplified. Among these, (2) and (3) are particularly preferable in terms that a hydrophilic effect can be markedly obtained and a change over time is small.

As these surface modification treatment methods, methods described in the paragraphs [0017] to [0034] of JP2013-75264A can be exemplified and the contents described in this document are incorporated in the present invention.

<Formation of Protective Layer>

It is preferable that the method of producing the gas separation membrane includes a process of forming a protective layer on the surface of the separation layer or the surface of the separation layer subjected to the surface treatment.

The method of forming a protective layer on the surface of the separation layer subjected to the surface treatment is not particularly limited, but it is preferable to coat the surface with a composition including a material of the protective layer and an organic solvent. Examples of the organic solvent include organic solvents used to form the separation layer. The coating method is not particularly limited and a known method can be used. For example, the coating can be performed according to a spin coating method.

The method of irradiating a curable composition with radiation when the protective layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 second to 30 seconds.

The radiant energy is preferably 10 mW/cm$^2$ to 500 mW/cm$^2$.

<Formation of Resin Layer>

It is preferable that the method of producing the gas separation membrane includes a process of forming a resin layer on a support.

The method of forming a resin layer on the support is not particularly limited, but it is preferable to coat the surface with a composition including a material of the resin layer and an organic solvent. The coating method is not particularly limited and a known method can be used. For example, the coating can be performed according to a spin coating method.

The method of irradiating a curable composition with radiation when the resin layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 second to 30 seconds.

The radiant energy is preferably 10 mW/cm$^2$ to 500 mW/cm$^2$.

<Method of Separating Gas Mixture>

Using the gas separation membrane of the present invention, it is possible to perform separation of a gas mixture.

In the method of separating a gas mixture for the gas separation membrane of the present invention, the components of the gas mixture of raw materials are affected by the production area of the raw materials, the applications, or the use environment and are not particularly defined, but it is preferable that the main components of the gas mixture are carbon dioxide and methane, carbon dioxide and nitrogen, or carbon dioxide and hydrogen. That is, the proportion of carbon dioxide and methane or carbon dioxide and hydrogen in the gas mixture is preferably in a range of 5% to 50% and more preferably in a range of 10% to 40% in terms of the proportion of carbon dioxide. In a case where the gas mixture is present in the coexistence of an acidic gas such as carbon dioxide or hydrogen sulfide, the method of separating the gas mixture using the gas separation membrane of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the method of separating a gas mixture includes a process of allowing carbon dioxide to selectively permeate from mixed gas including carbon dioxide and methane. The pressure during gas separation is preferably in a range of 1 MPa to 10 MPa and more preferably in a range of 2 MPa to 7 MPa. Further, the temperature during gas separation is preferably in a range of –30° C. to 90° C. and more preferably in a range of 15° C. to 70° C.

[Gas Separation Membrane Module]

A gas separation membrane module of the present invention includes the gas separation membrane of the present invention.

It is preferable that the gas separation membrane of the present invention is used for a thin film composite obtained by combining with a porous support and also preferable that the gas separation membrane is used for a gas separation membrane module using this thin film composite. Further, using the gas separation membrane, the thin film composite, or the gas separation membrane module of the present invention, a gas separation device having means for performing separation and recovery of gas or performing separation and purification of gas can be obtained. The gas separation membrane of the present invention can be made into a module and preferably used. Examples of the module include a spiral type module, a hollow fiber type module, a pleated module, a tubular module, and a plate & frame type module. The gas separation membrane of the present invention may be applied to a gas separation and recovery apparatus which is used together with an absorption liquid described in JP2007-297605A according to a membrane/absorption hybrid method.

EXAMPLES

The characteristics of the present invention will be described in detail with reference to examples and comparative examples (note that the comparative examples are not based on known technology) described below. The materials, the amounts to be used, the ratios, the treatment contents, and the treatment procedures shown in the examples described below can be appropriately changed as long as it is within the gist of the present invention. Accordingly, the scope of the present invention should not be limitatively interpreted by the specific examples described below.

Moreover, "part" and "%" in the sentences are on a mass basis unless otherwise noted.

Example 1

<Preparation of Resin Layer>

(Preparation of Radiation-Curable Polymer Having Dialkylsiloxane Group)

An n-heptane solution including 39.087% by mass of commercially available UV9300 (polydimethylsiloxane (PDMS) having the following structure, manufactured by Momentive Performance Materials Inc., oxirane having an epoxy equivalent of 950 g/mol, weight average molecular weight according to viscometry: 9,000), 10.789% by mass of commercially available X-22-162C (both-terminal carboxyl-modified silicone having the following structure, manufactured by Shin-Etsu Chemical Co., Ltd., weight average molecular weight: 4,600), and 0.007% by mass of DBU (1,8-diazabicyclo[5.4.0]undec-7-ene) was prepared, and 168 hours passed while the solution was maintained at 95° C., thereby obtaining a radiation-curable polymer solution (viscosity of 22.8 mPa·s at 25° C.) having a poly(siloxane) group.

(Preparation of Polymerizable Radiation-Curable Composition)

The radiation-curable polymer solution was cooled to 20° C., and n-heptane was added thereto to dilute the solution until the concentration thereof became 5% by mass. A radiation-curable composition was prepared by filtering the obtained solution using filter paper having a filtration accuracy of 2.7 µm. 0.1% by mass of UV9380C (45% by mass of bis(4-dodecylphenyl)iodonium hexafluoroantimonate, manufactured by Momentive Performance Materials Inc., alkyl glycidyl ether solution) serving as a photopolymerization initiator and 0.1% by mass of Ti(OiPr)$_4$ (titanium (IV) isopropoxide manufactured by Dorf Ketal Chemicals) were added to the radiation-curable composition, thereby preparing a polymerizable radiation-curable composition.

(Coating Porous Support with Polymerizable Radiation-Curable Composition and Formation of Resin Layer)

A polyacrylonitrile (PAN) porous membrane (the polyacrylonitrile porous membrane was present on non-woven fabric, the thickness of the film including the non-woven fabric was approximately 180 µm) was used as a support, and the support was spin-coated with the polymerizable radiation-curable composition, subjected to a UV treatment (LIGHT HAMMER 10, manufactured by Fusion UV System Corporation, D-VALVE) under the conditions of a UV intensity of 24 kW/m for a treatment time of 10 seconds, and then dried. In this manner, a resin layer including a metal complex and a dialkylsiloxane group and having a thickness of 200 μm was formed on the porous support.

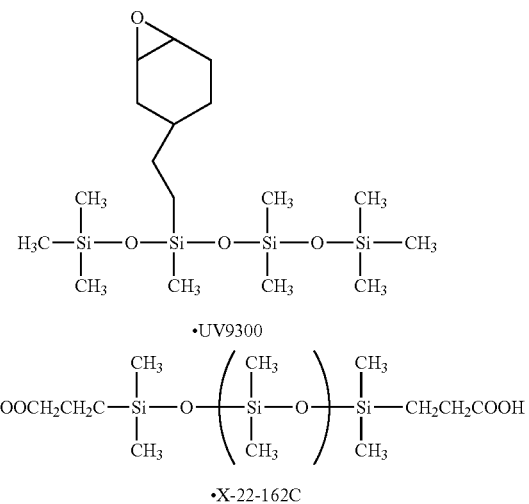

<Formation of Separation Layer>
(Synthesis of Block Copolymer)
123 mL of N-methylpyrrolidone and an acid anhydride A having the following structure were added to a 1 L three-necked flask, dissolved at 40° C., and stirred in a nitrogen stream. 84.0 mL of a solution of a diamine A in N-methylpyrrolidone having the following structure and polydimethylsiloxane A having an amine at one molecular chain terminal and having the following structure was added

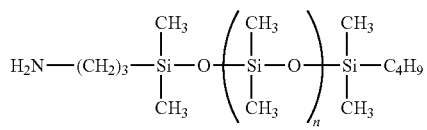

dropwise to the flask for 30 minutes while the temperature of the system was maintained at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of an acetic anhydride (manufactured by Wako Pure Chemical Industries, Ltd.) were respectively added to the reaction solution, and then the reaction solution was further stirred at 80° C. for 3 hours. Subsequently, 676.6 mL of acetone was added to the reaction solution for dilution. 1.15 L of methanol and 230 mL of acetone were added to a 5 L stainless steel container and stirred, and the reaction solution diluted with acetone was added dropwise thereto. The obtained polymer crystals were suction-filtered and air-dried at 60° C., thereby obtaining a block copolymer A having the following structure. The block copolymer A includes a first segment having m repeating units and a second segment having n repeating units, the molecular weight of the first segment (PI molecular weight) was $1.01 \times 10^5$ and the molecular weight of PDMS corresponding to the second segment was $1.53 \times 10^4$.

Further, the charging ratio of the acid anhydride A to the diamine A was set to satisfy "(amount of acid anhydride A and diamine A to be charged)=(amount of polydimethylsiloxane A to be charged/molecular weight of polydimethylsiloxane A)×(PI molecular weight)" and synthesis was performed. The charging ratio of the acid anhydride to the diamine was set to 1:1 in terms of the molar ratio.

Acid anhydride A

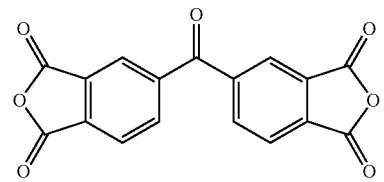

Diamine A

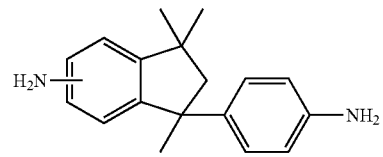

Polydimethylsiloxane A: molecular weight of $1.53 \times 10^4$

Block copolymer A

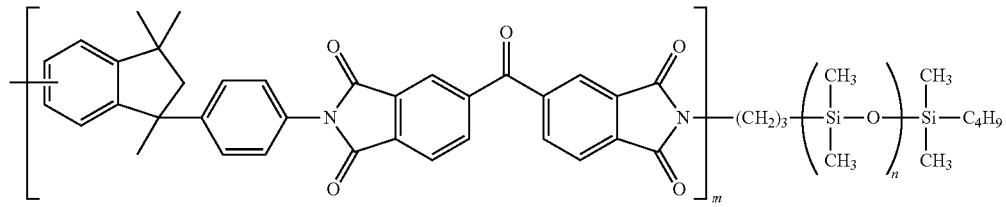

(Coating of Block Copolymer-Containing Composition, Surface Modification Treatment, and Formation of Separation Layer)

A resin layer was spin-coated with a methyl ethyl ketone (MEK) solution including the block copolymer A synthesized in the above-described manner so that the dry thickness became the value described in the following Table 1, and the resin layer was dried.

Thereafter, a UV ozone treatment (treatment for 6 minutes using a UV ozone treatment device (NL-UV253, manufactured by NIPPON LASER & ELECTRONICS LAB.)) was performed as surface modification, thereby forming a separation layer.

<Formation of Protective Layer>

Next, the surface of the separation layer subjected to a UV ozone treatment was spin-coated with a polymerizable radiation-curable composition used to form a resin layer, and a protective layer having a thickness of 200 μm was formed on the separation layer by performing a UV treatment under the UV treatment conditions similar to those for formation of a resin layer, thereby preparing a gas separation membrane.

The obtained separation membrane was set as a gas separation membrane of Example 1.

<Confirmation of Diameter of Spherical Second Structure>

In the separation layer, the diameter of the spherical second structure was acquired as follows.

The section of a sample film of the gas separation membrane of Example 1 was observed using a scanning electron microscope and a transmission electron microscope, and diameters Rk of respective spherical second structures were acquired from the image. The average value of the diameters RK of 100 or more spherical second structures was set as R. In order to make the contrast clearer, staining using osmium tetraoxide may be performed before the observation.

Example 2

A gas separation membrane of Example 2 was prepared in the same manner as in Example 1 except that the diameter of the spherical second structure was changed by changing a block copolymer A used for formation of a separation layer with a block copolymer B synthesized according to the following method in Example 1.

In the block copolymer B, the molecular weight of the first segment (PI molecular weight) was $4.87 \times 10^4$ and the molecular weight of PDMS corresponding to the second segment was $5.96 \times 10^3$.

Further, the block copolymer B was synthesized in the same manner as that of the block copolymer A except that the charging ratio of the acid anhydride A to the diamine A was set to satisfy "(amount of acid anhydride A and diamine A to be charged)=(amount of polydimethylsiloxane B to be charged/molecular weight of polydimethylsiloxane B)×(PI molecular weight)". The charging ratio of the acid anhydride A to the diamine A was set to 1:1 in terms of the molar ratio.

Polydimethylsiloxane B: molecular weight of $5.96 \times 10^3$

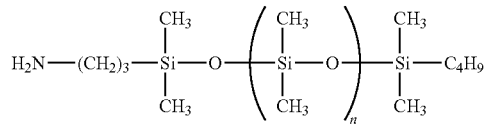

Example 3

(Synthesis of Polyimide Homopolymer)

123 mL of N-methylpyrrolidone and an acid anhydride A were added to a 1 L three-necked flask, dissolved at 40° C., and stirred in a nitrogen stream. 84.0 mL of a solution of a diamine A in N-methylpyrrolidone was added dropwise to the flask for 30 minutes while the temperature of the system was maintained at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of an acetic anhydride (manufactured by Wako Pure Chemical Industries, Ltd.) were respectively added to the reaction solution, and then the reaction solution was further stirred at 80° C. for 3 hours. Subsequently, 676.6 mL of acetone was added to the reaction solution for dilution. 1.15 L of methanol and 230 mL of acetone were added to a 5 L stainless steel container and stirred, and the reaction solution diluted with acetone was added dropwise thereto. The obtained polymer crystals were suction-filtered and air-dried at 60° C., thereby obtaining a polyimide (PI) homopolymer having the following structure. The PI homopolymer had a weight average molecular weight of 100,000.

The charging ratio of the acid anhydride to the diamine was set to 1:1 in terms of the molar ratio.

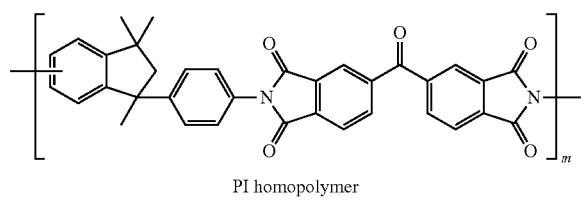

PI homopolymer

A gas separation membrane of Example 3 was prepared in the same manner as in Example 1 except that an MEK solution respectively including 50% by mass of the block copolymer C synthesized according to a method described below and 50% by mass of a PI homopolymer was used in the same amount of the MEK solution of the block copolymer A in place of the MEK solution thereof used for formation of a separation layer in Example 1.

Further, the diameter of the spherical second structure was as listed in the following Table 1 without changing other conditions.

In the block copolymer C, the molecular weight of the first segment (PI molecular weight) was $1.19 \times 10^5$ and the molecular weight of PDMS corresponding to the second segment was $4.61 \times 10^4$.

Further, the block copolymer C was synthesized in the same manner as that of the block copolymer A except that the charging ratio of the acid anhydride A to the diamine A was set to satisfy "(amount of acid anhydride A and diamine A to be charged)=(amount of polydimethylsiloxane C to be charged/molecular weight of polydimethylsiloxane C)×(PI molecular weight)". The charging ratio of the acid anhydride A to the diamine A was set to 1:1 in terms of the molar ratio.

Polydimethylsiloxane C: molecular weight of $4.61 \times 10^4$

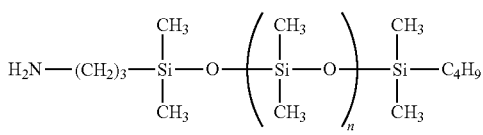

Comparative Example 1

A gas separation membrane of Comparative Example 1 was prepared in the same manner as in Example 3 except that the coating thickness after drying of the MEK solution respectively including 50% by mass of the block copolymer C used for formation of a separation layer and 50% by mass of the PI homopolymer in Example 3 was changed as listed in the following Table 1.

Comparative Example 2

A gas separation membrane of Comparative Example 2 was prepared in the same manner as in Example 3 except that an MEK solution of the block copolymer C was used, in place of the MEK solution respectively including 50% by mass of the block copolymer C used for formation of a separation layer and 50% by mass of the PI homopolymer in Example 3, so that the volume fraction of the second structure was increased and the second structure was not formed to have a spherical shape.

Comparative Example 3

A gas separation membrane of Comparative Example 3 was prepared in the same manner as in Example 1 except that an MEK solution of the PI homopolymer was used in the same amount of the MEK solution of the block copolymer A in place of the MEK solution thereof used for formation of a separation layer in Example 1.

[Evaluation]
<Characteristics of Separation Layer>
(Volume Fraction of Spherical Second Structure)

The volume fraction of the spherical second structure with respect to the separation layer was acquired as the ratio of the area of the figure corresponding to the spherical second structure 12 to the area corresponding to the separation layer in the SEM image showing the section of the separation layer of the gas separation membrane.

(Characteristics of First Structure)

A single layer film of the homopolymer of the first segment of the above-described block copolymer A serving as the material of the first structure was separately prepared and the gas permeability of the film was measured according to the following method. The obtained gas separation selectivity α and permeability coefficient $P_{CO2}$ of $CO_2$ were respectively set as the gas separation selectivity αs of the first structure and the gas permeability Ps of the first structure.

The respective gas permeabilities of $CO_2$ and $CH_4$ were measured by TCD detection type gas chromatography by setting the temperature thereof to 40° C. and the total pressure on the gas supply side to 4 MPa (partial pressure of $CO_2$ and $CH_4$: 2 MPa) using a mass flow controller such that the volume ratio of carbon dioxide ($CO_2$) to methane ($CH_4$) was set to 1:1 using a SUS316 STAINLESS STEEL CELL (manufactured by DENISSEN Ltd.) having high pressure resistance. The gas separation selectivity αs of the first structure was calculated as a ratio ($P_{CO2}/P_{CH4}$) of the permeability coefficient $P_{CO2}$ of $CO_2$ to the permeability coefficient $P_{CH4}$ of $CH_4$ of this film. The gas permeability Ps of the first structure was set as the permeability coefficient $P_{CO2}$ of $CO_2$ of this film.

Further, the unit of the gas permeability was represented by the unit of GPU [1 GPU=1×10$^{-6}$ cm$^3$ (STP)/cm$^2$·sec·cmHg] showing the permeation flux (also referred to as the transmittance, the permeability, or the permeance) per pressure difference or by the unit of Barrer [1 Barrer: 1×10$^{-10}$ cm$^3$ (STP)·cm/cm$^2$·sec·cmHg] showing the permeability coefficient. In the present specification, the gas permeability was shown using a symbol Q in the case of the GPU unit and the gas permeability was shown using a symbol P in the case of the Barrer unit.

GPU is a unit showing the physical properties of a film itself that is dependent on the thickness of the film and Barrer is a unit per unit film thickness that is not dependent on the thickness of the film.

(Characteristics of Spherical Second Structure)

A single layer film of the homopolymer of the second segment of the above-described block copolymer A serving as the material of the spherical second structure was separately prepared and the gas permeability of the film was measured according to the following method. The obtained gas separation selectivity α and permeability coefficient $P_{CO2}$ of $CO_2$ were respectively set as the gas separation selectivity αf of the spherical second structure and the gas permeability Pf of the spherical second structure.

The respective gas permeabilities of $CO_2$ and $CH_4$ were measured by TCD detection type gas chromatography by setting the temperature thereof to 40° C. and the total pressure on the gas supply side to 4 MPa (partial pressure of $CO_2$ and $CH_4$: 2 MPa) using a mass flow controller such that the volume ratio of carbon dioxide ($CO_2$) to methane ($CH_4$) was set to 1:1 using a SUS316 STAINLESS STEEL CELL (manufactured by DENISSEN Ltd.) having high pressure resistance. The gas separation selectivity αf of the spherical second structure was calculated as a ratio ($P_{CO2}/P_{CH4}$) of the permeability coefficient $P_{CO2}$ of $CO_2$ to the permeability coefficient $P_{CH4}$ of $CH_4$ of this film. The gas permeability Pf of the spherical second structure was set as the permeability coefficient $P_{CO2}$ of $CO_2$ of this film.

(αs/αf and Ps/Pf)

The values of αs/αf and Ps/Pf were calculated from the values of αs, αf, Ps, and Pf obtained in the above-described manner.

<Evaluation of Gas Permeability of Gas Separation Membrane>

In gas separation membranes, which are the obtained thin film composites, of the respective examples and the comparative examples, the respective gas permeabilities of $CO_2$ and $CH_4$ were measured by TCD detection type gas chromatography by setting the temperature thereof to 40° C. and the total pressure on the gas supply side to 4 MPa (partial pressure of $CO_2$ and $CH_4$: 2 MPa) using a mass flow controller such that the volume ratio of carbon dioxide ($CO_2$) to methane ($CH_4$) was set to 1:1 using a SUS316 STAINLESS STEEL CELL (manufactured by DENISSEN Ltd.) having high pressure resistance. The gas separation selectivity of a gas separation membrane of each example and each comparative example was calculated as a ratio ($P_{CO2}/P_{CH4}$) of the permeability coefficient $P_{CO2}$ of $CO_2$ to the permeability coefficient $P_{CH4}$ of $CH_4$ of this film. The $CO_2$ permeability of a gas separation membrane of each example and each comparative example was set as the permeability $Q_{CO2}$ of $CO_2$ of this film.

The obtained results were evaluated based on the following criteria.

(Evaluation of Gas Separation Selectivity)

A: The value was 20 or greater.

B: The value was less than 20.

(Evaluation of $CO_2$ Permeability)

A: The value was 28 GPU or greater.

B: The value was less than 28 GPU.

The results of the respective test examples described above are listed in the following Table 1.

TABLE 1

| | Structure of separation layer | | | Composition ratio with polymer of separation layer | | | Characteristics of separation layer | | | | | Characteristics of gas separation membrane | |
|---|---|---|---|---|---|---|---|---|---|---|---|---|---|
| | Average diameter R of spherical second structure (nm) | Thickness L of separation layer (nm) | R/L | Volume fraction of second structure (% by volume) | Block co-polymer | PI homo-polymer (% by mass) | Separation selectivity αs of first structure | Permeability coefficient Ps of first structure (barrer) | Separation selectivity αf of second structure | Permeability coefficient Pf of second structure (barrer) | αs/αf | Ps/Pf | Separation selectivity | CO₂ permeability |
| | | | | | | (% by mass) | | | | | | | | |
| Example 1 | 18 | 100 | 0.18 | 18 | A | 100 | 0 | 28 | 2.5 | 2.7 | 5416 | 10.4 | 0.0005 | A | A |
| Example 2 | 15 | 100 | 0.15 | 15 | B | 100 | 0 | 28 | 2.5 | 2.7 | 5416 | 10.4 | 0.0005 | A | A |
| Example 3 | 25 | 100 | 0.25 | 19 | C | 50 | 50 | 28 | 2.5 | 2.7 | 5416 | 10.4 | 0.0005 | A | A |
| Comparative Example 1 | 25 | 50 | 0.5 | 19 | C | 50 | 50 | 28 | 2.5 | 2.7 | 5416 | 10.4 | 0.0005 | B | A |
| Comparative Example 2 | 25 | 100 | — | 36 | C | 100 | 0 | 28 | 2.5 | 2.7 | 5416 | 10.4 | 0.0005 | B | A |
| Comparative Example 3 | None | 100 | — | 0 | — | 0 | 100 | 28 | 2.5 | — | — | — | — | A | B |

From Table 1, it was understood that the gas separation membrane of the present invention had high gas permeability and high gas separation selectivity. Further, when the section of a sample film of the gas separation membrane of Example 1 was observed by a scanning electron microscope and a transmission electron microscope, it was confirmed that the gas separation membrane of the present invention had a structure in which the first structure of the separation layer was continuous in the thickness direction. Further, in the gas separation membrane of the present invention, it was confirmed that the first structure of the separation layer includes components derived from the first segment of the above-described block copolymer A through section EDX (energy dispersion type X-ray analysis) observation and it was confirmed that the spherical second structure of the separation layer includes components derived from the second segment of the above-described block copolymer A through section EDX observation.

Meanwhile, from Comparative Example 1, it was understood that the gas separation selectivity was low in the case where the relationship between the diameter R of the spherical second structure and the thickness L of the separation layer did not satisfy Formula (1).

From Comparative Example 2, it was understood that the separation selectivity was low in the case where the separation layer was set to a film whose volume fraction of components having high gas permeability was high and the spherical second structure was not formed into a separation layer.

From Comparative Example 3, it was understood that the gas permeability was low in the case where the separation layer was set to a film in which a phase separation structure for which only components having high gas separation selectivity (components having low gas permeability) were used was not formed and the spherical second structure was not formed into a separation layer.

Examples 101 to 103

Modularization

Spiral type modules were prepared using the gas separation membranes prepared in Examples 1 to 3 by referring to JP1993-168869A (JP-H05-168869A). The obtained gas separation membrane modules were set as gas separation membrane modules of Examples 101 to 103.

It was confirmed that the prepared gas separation membrane modules of Examples 101 to 103 were excellent according to performance of the incorporated gas separation membranes.

EXPLANATION OF REFERENCES

1: separation layer
2: protective layer
3: resin layer
4: support
10: gas separation membrane
11: first structure
12: spherical second structure
L: thickness of separation layer
Rk: diameter of spherical second structure

What is claimed is:

1. A gas separation membrane comprising:
   a separation layer which includes (i) at least one homopolymer selected from polyimide, polybenzoxazole, and cellulose acetate, and (ii) a block copolymer having at least a first segment and a second segment,
   wherein the separation layer has a phase separation structure that has at least a first structure derived from the first segment and a spherical second structure derived from the second segment,
   the spherical second structure satisfies the following Formula 1,
   the first structure and the spherical second structure satisfy the following Formula 2, and
   the first structure has a structure that is continuous in the thickness direction over the entire thickness of the separation layer, $$R/L < 0.4 \qquad \text{Formula 1:}$$

in Formula 1, R represents the average diameter of the spherical second structure and the unit thereof is nm, and L represents the thickness of the separation layer and the unit thereof is nm, $$P_s/P_f < 1 \qquad \text{Formula 2:}$$

in Formula 2, Ps represents the permeability coefficient of the first structure and unit thereof is Barrer, Pf represents the permeability coefficient of the spherical second structure and the unit thereof is Barrer, and, in this case, Ps and Pf represent the permeability coefficient of a gas with a higher permeability coefficient in the first structure, among two kinds of gases.

2. The gas separation membrane according to claim 1, wherein the first structure and the spherical second structure satisfy the following Formula 3 and the Ps and Pf satisfy the following Formula 2A, $$\alpha s/\alpha f > 3 \qquad \text{Formula 3:}$$

in Formula 3, αs represents the gas separation selectivity of the first structure and αf represents the gas separation selectivity of the spherical second structure, and, in this case, αs and αf represent the gas separation selectivity for a gas mixture consisting of two kinds of gases and having the same composition as each other, $$Ps/Pf < 0.1. \qquad \text{Formula 2A:}$$

3. The gas separation membrane according to claim 1, wherein the first segment is at least one selected from polyimide, polyamide, cellulose acetate, and polybenzoxazole.

4. The gas separation membrane according to claim 1, wherein the second segment is at least one selected from polydimethylsiloxane, poly(1-trimethylsilyl-1-propyne), and polyethylene oxide.

5. The gas separation membrane according to claim 1, wherein the separation layer is formed on a support.

6. The gas separation membrane according to claim 5, wherein the support is formed of non-woven fabric and a porous layer provided on at least one surface of the non-woven fabric.

7. The gas separation membrane according to claim 5, further comprising a resin layer between the separation layer and the support.

8. The gas separation membrane according to claim 7, wherein the a material of the resin layer is at least one selected from polydimethylsiloxane, poly(1-trimethylsilyl-1-propyne), and polyethylene oxide.

9. The gas separation membrane according to claim 1, further comprising a protective layer on the separation layer.

10. The gas separation membrane according to claim 9, wherein a material of the protective layer is at least one selected from polydimethylsiloxane, poly(1-trimethylsilyl-1-propyne), and polyethylene oxide.

11. A gas separation membrane module comprising the gas separation membrane according to claim 1.

* * * * *